US005528288A

United States Patent [19]

Sandor et al.

[11] Patent Number: 5,528,288
[45] Date of Patent: Jun. 18, 1996

[54] ILLUMINATION CONTROL SYSTEM FOR A FILM SCANNER

[75] Inventors: Richard J. Sandor; Steven Sitter; Drew D. Summers; Andrew F. Kurtz; Charles P. Divito, all of Rochester, N.Y.

[73] Assignee: Eastman Kodak Company, Rochester, N.Y.

[21] Appl. No.: 312,162

[22] Filed: Sep. 26, 1994

Related U.S. Application Data

[63] Continuation of Ser. No. 73,832, Jun. 8, 1993, abandoned.

[51] Int. Cl.$^6$ ................................................. H04N 5/253
[52] U.S. Cl. .............................. 348/97; 348/363; 354/270
[58] Field of Search ........................ 348/96–100, 102–103, 348/105–106, 108, 363; 354/18, 120, 113, 270, 228, 448; H04N 5/253

[56] References Cited

U.S. PATENT DOCUMENTS

| | | | |
|---|---|---|---|
| 3,962,707 | 6/1976 | Galbraith | 354/451 |
| 3,980,407 | 9/1976 | Hill | 355/71 |
| 4,118,714 | 10/1978 | Okajima et al. | 354/451 X |
| 4,290,675 | 9/1981 | Beiser | 354/270 |
| 4,531,820 | 7/1985 | Petersen | 354/234.1 |
| 4,558,368 | 12/1985 | Aoki et al. | 358/228 |
| 4,688,099 | 8/1987 | Funston | 348/96 |
| 4,710,013 | 12/1987 | Wong | 354/446 X |
| 4,868,383 | 9/1989 | Kurtz et al. | 250/228 |
| 4,875,103 | 10/1989 | Bridges et al. | 358/214 |
| 4,884,091 | 11/1989 | Nakagomi al. | 354/270 |
| 4,899,040 | 2/1990 | Davis et al. | 250/216 |
| 4,959,978 | 9/1990 | Takahashi et al. | 358/228 |
| 4,974,068 | 11/1990 | Hiramatsu et al. | 358/75 |
| 5,003,379 | 3/1991 | Moore, Jr. et al. | 358/54 |
| 5,010,410 | 4/1991 | Bernstein | 348/97 |
| 5,012,346 | 4/1991 | DeJager et al. | 358/214 |
| 5,023,723 | 6/1991 | Date et al. | 358/225 |
| 5,038,216 | 8/1991 | Easterly et al. | 358/228 |
| 5,072,162 | 12/1991 | Sato et al. | 318/268 |
| 5,081,535 | 1/1992 | Kondo et al. | 358/228 |
| 5,084,754 | 1/1992 | Tomitaka | 358/209 |
| 5,084,755 | 1/1992 | Ozaki | 358/214 |
| 5,115,319 | 3/1992 | Arai et al. | 358/228 |
| 5,122,880 | 6/1992 | Nagano | 358/209 |
| 5,155,596 | 10/1992 | Kurtz et al. | 358/214 |
| 5,161,026 | 11/1992 | Mabuchi et al. | 358/225 |
| 5,184,227 | 2/1993 | Foley | 354/120 |
| 5,414,460 | 5/1995 | Neistit et al. | 348/363 |

FOREIGN PATENT DOCUMENTS 0363969  10/1989  European Pat. Off. ......... H04N 1/46

OTHER PUBLICATIONS

Kurtz et al., "Optical scanning system for a CCD telecine for HDTV", *SPIE*, vol. 1448, pp. 191–205 (1991).
URSA Product Brochure, Rank Cintel Ltd., Hertfordshire, U.K., dated Jan. 9, 1989.

Primary Examiner—Wendy R. Greening
Assistant Examiner—Bipin Shalwala
Attorney, Agent, or Firm—Joseph F. Breimayer

[57] ABSTRACT

In an illumination system for a film telecine scanner of the type adapted to provide a line of illumination on the image frames of a film which is supported for movement in a film gate of the scanner, an improved light control system for adjusting the amount of light that is delivered from a light source to an integrating cylinder to take into account fluctuations in intensity of the light source and desired intensity changes in the line of illumination upon a change of scene in the image frames of the film as the film is being scanned. The light control system comprises an aperture defining mechanism, a position servo regulator that maintains the aperture at a desired aperture opening despite disturbances tending to change the aperture between aperture changes, and an intensity servo regulator that takes into account the lamp intensity in resetting the aperture to a new position in response to a commanded light intensity related to a scene change, whereby aperture changes may be effected within the time of scanning a single image frame. The aperture defining mechanism employs first and second movable blades placed at a location in the optical path and movable between a full open aperture position outside the optical path and to one of a plurality of stopped down aperture defining positions interrupting the optical path and the resulting illumination line intensity in the course of scanning a single image frame.

47 Claims, 10 Drawing Sheets

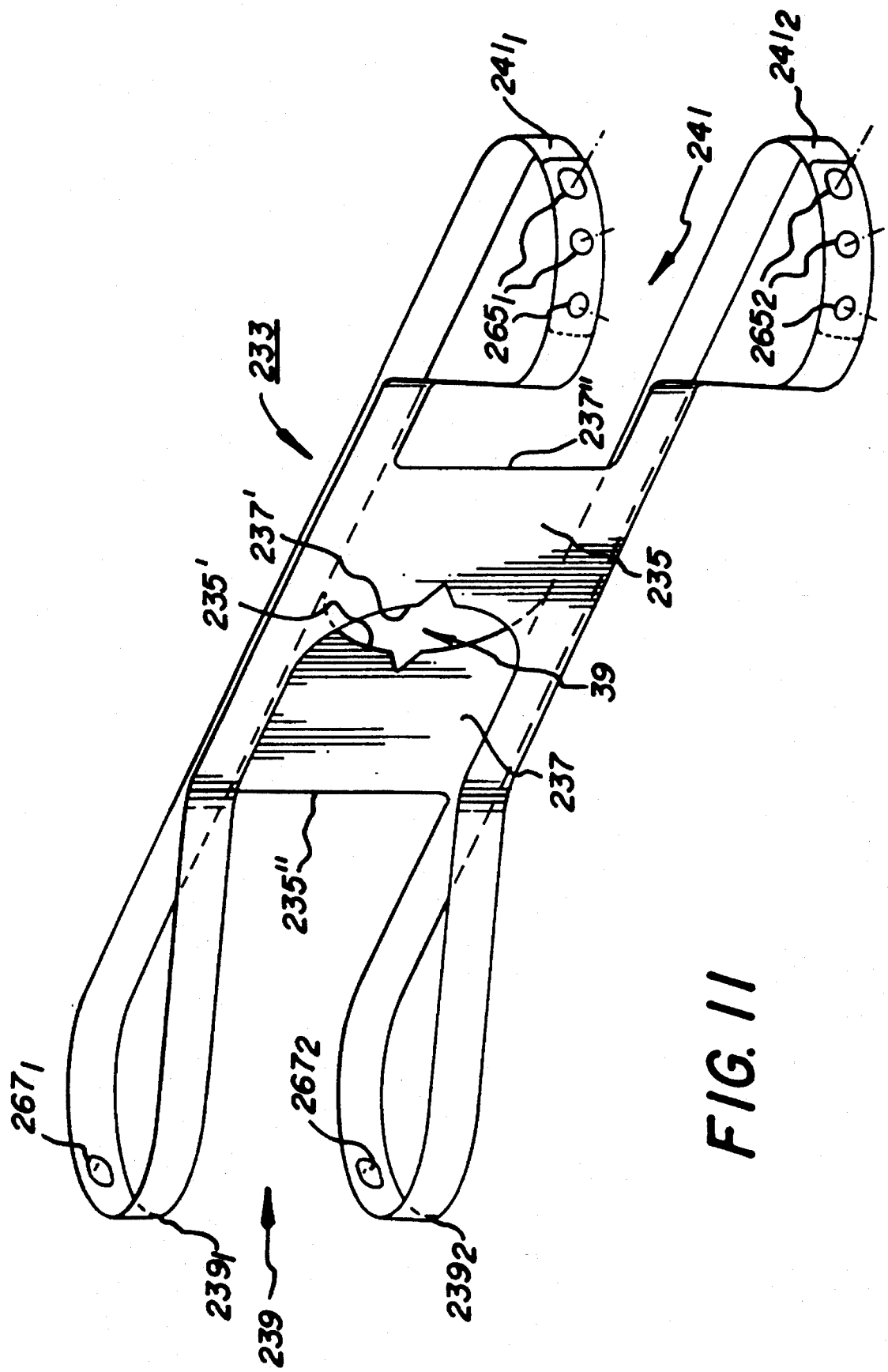

ILLUMINATION CONTROL SYSTEM FOR A FILM SCANNER

This is a Continuation of application Ser. No. 073,832, filed 8 Jun. 1993, now abandoned.

CROSS-REFERENCE TO RELATED APPLICATIONS

Reference is made to commonly assigned U.S. patent application Ser. No. 073,820 entitled "Mechanical Aperture for Controlling Illumination Level", and filed on even date herewith now U.S. Pat. No. 5,414,460.

BACKGROUND OF THE INVENTION

1. Field of the Invention

This invention relates to an illumination system for a film scanner and more particularly, to an aperture control system suitable for wide dynamic range of operation to a specified illumination level within the time allotted for scanning a film frame in real time in a telecine film scanner.

2. Description of the Prior Art

State of the art illumination systems for telecine film scanners typically include light-sensitive, charge-coupled device (CCD) linear arrays which provide a serial output representing a line of a television raster and a light source for illuminating a linear section of the film being scanned with either a scanning light beam or a line of diffuse light. For color television, one version of a film scanner can include a light source that is subjected to dichroic filtration to tailor the spectral content of the light according to the film to be scanned and directed into a light integrator which transforms a light beam from a light source into a line of diffuse light emitted through an elongated aperture for illumination of the film frame. The line of light must be sufficiently uniform in intensity and diffusion along its length and have the red, green and blue spectral radiance for the film being scanned. The film is held in a cylindrical shape and moved past the line of diffuse light. The light passing through the illuminated linear section is color and intensity modulated by the image therein and imaged onto three color filtered CCD arrays as described, for example, in commonly assigned U.S. Pat. Nos. 5,012,346 to DeJager et al. and 5,003,379 to Moore, Jr. et al.

The film motion provides the vertical (frame) scan, and the linear, synchronized electronic cycling of the CCD arrays provides the horizontal (line) scan of a rasterized television signal with both chrominance and luminance components. A number of the considerations taken into account in scanning positive or print and negative color film stocks with such telecine film scanners is set forth in the article "Optical scanning system for a CCD telecine for HDTV" by Kurtz et al. in *SPIE*, vol. 1448 Camera and Input Scanner Systems, 1991, pp. 191–205.

As described in that article and in commonly assigned U.S. Pat. Nos. 4,868,383 and 5,155,596, to Kurtz et al, and 5,012,346, to DeJager et al, such film scanner linear light sources have difficulty transforming light emitted by a source lamp into a line of diffuse light of sufficient, uniform intensity or brightness for the full lamp life and operating intensity range required and which does not vary from moment to moment due to lamp "noise". In the '383 and '346 patents, a linear light integrator is provided with a light intensity sensor and feedback circuit for regulating the lamp power supply to dampen light output intensity fluctuations of the Xenon arc lamp. Intensity fluctuations from the targeted lamp intensity may be both temporal and spatial, as arc length and position within the lamp envelope varies and shadows caused thereby change from moment to moment. The severity of the fluctuations increases as lamp current is decreased, so the Xenon arc lamp is driven at a relatively high current and intensity.

The integrating cylinder is designed to integrate the light beam from the lamp so that a line of light is emitted that is uniform in intensity along the length of the aperture at any given moment, regardless of spatial fluctuations in light beam intensity. Consequently, the intensity of the uniform line of light varies temporally. The temporal variation in integrated light intensity from the target or reference intensity is referred to as illumination "noise" that is considered in measuring the illumination signal-to-noise (S/N) ratio performance of the system. In the '596 patent, the instantaneous intensity of the light in the integrating cylinder is monitored by the light intensity sensor and feedback circuit to develop a correction factor to increase or decrease the lamp drive current to improve the overall illumination S/N performance.

As described in the '596 patent, there is also a need to regulate the intensity of light entering a light integrating cylinder in response to changing characteristics of the optical path, the film scanning speed, the film type, and the ageing of the arc lamp. Light intensity can only be varied in a narrow range by controlling current to the short arc Xenon lamp, because lamp life is shortened as lamp current is increased, and illumination S/N performance is degraded as lamp current is decreased. Moreover, when CCD arrays are employed, the further electrical signal-to-noise (S/N) performance of the CCD elements as a function of light intensity limits the range of variation in illumination.

The CCD elements, in converting light into electrical output signals, create a relatively fixed level of electrical operating noise which is included with the output signal representative of the intensity of the light transmitted by the image pixels. If the elements are not charged by the pixel illumination intensity to a level in the normal intensity variation operating range, e.g. may occur when low intensity light is blocked in a dark scene, the fixed noise contributes a greater proportion to the output signal, and the S/N ratio decreases, leading to loss of image detail. Widening the lamp intensity output range would therefore degrade system S/N performance in the low output regions of the range. Lamp current control is thus relegated to a narrow range of modulation of the lamp current in response to illumination level S/N variations in lamp arc performance.

The wide dynamic range of adjustment necessary to scan different types of film is left to a motor driven aperture wheel described in the '596 patent and the above-referenced article. The aperture wheel intercepts the light beam from the arc lamp before it enters the integrating cylinder and is set to provide a specific aperture to adjust overall light intensity in the light beam depending on the film type and operating conditions of the lamp for the duration of scanning of the film.

There are additional reasons for adjusting the intensity of the light beam than compensating for film type and for temporal fluctuations in lamp output. Typically, a given movie contains a variety of scenes resulting in differing average film densities from scene to scene, e.g. dark night and bright day scenes. In a darkened theater, when the scenes are projected from the print movie film, even the darkest scenes are visible, and the contrast between the darkest and lightest parts of the scene is high. However, the television viewing experience is quite different. The television is usually viewed in moderately to brightly lit surroundings and this ambient light reduces the contrast between dark and bright portions of the image. Furthermore, the television screen image contrast and resolution is limited by phosphor flare and lag resulting in a lower resolution and dynamic contrast range than a projected print movie film. The combined effect of the bright ambient lighting and the low dynamic range screen is that television images of a movie have considerably less visual contrast when compared to the original projected print.

To compensate, the experienced telecine operator or colorist will pre-program the color balance and signal level settings on a scene by scene basis. The colorist seeks to compensate for the deficiencies in television images and to still provide artistic qualities of each scene similar to the original projected scene.

For a dark scene, where even the highlights are dark, the colorist may increase the signal level such that the highlight is brought to 100% video signal level. This also has the effect of increasing the average signal level for the entire scene. Though this gain in signal level could be adjusted electronically, doing so has the effect of increasing noise levels as well. The preferred method for increasing the video signal would be to increase the illumination level by increasing the amount of light emitted by the integrating cylinder and directed on the film image frames. However, current telecine systems are incapable of changing light intensity at real time film frame rates.

Summarizing the above, the telecine conversion of negative, master and positive, print movie films for television broadcast or reproduction on videotape or videodisc for playback on television, particularly HDTV, involves a number of considerations described amply in the cited references. Temporal fluctuations in the arc lamp output intensity is one of the significant causes of flicker in the resulting video playback image. In addition, for aesthetic reasons relating to the differing viewing conditions and the limited or differing dynamic brightness range of television screens, it is desired to alter the scanning illumination upon a scene change from the baseline commanded light intensity value. The baseline commanded light intensity value is defined depending on the film type and has been set in the system described in the '596 patent by the position of the aperture wheel for the duration of the telecine conversion.

Problems to be Solved by the Invention

Thus, further enhancements to telecine control illumination system performance are still desired, particularly in allowing wide dynamic range of illumination adjustment in real time at normal film frame scanning speeds or video frame rates (nominally 33 millisecond per frame). The operating range of the arc lamp systems do not allow changes to light beam output or brightness while maintaining low noise illumination in response to a new commanded light intensity value that a colorist may specify. It is not desirable to electronically alter the gain of the CCD array, since doing so in response to low levels of illumination magnifies the noise component of the output signal. It is not possible to provide near real-time brightness control by adjusting scanning line intensity within one film frame scanning interval by rotating the motor driven aperture wheel described in the '596 patent. The size of the wheel, and thus its inertial mass, necessitated by the illumination beam diameter, poses a formidable challenge to developing a compact driver capable of indexing at film frame scanning rates. Also, the Gaussian distribution of beam intensity as a function of position within the generally circular light beam creates a non-linear control system gain detrimental to high bandwidth operation and consistent performance during level change with an aperture wheel. An illumination control system is desired that avoids using these approaches and provides rapid and accurate changes to the illumination level of the line of diffuse light.

SUMMARY OF THE INVENTION

In response to these demands, it is thus an object of the present invention to provide an improved light intensity control system for use in adjusting scanning light beam intensity in response to a scene change in the film being scanned.

It is a further object of the present invention to provide an adjustable intensity scanning light beam, wherein the generally circular, large diameter light beam of a lamp source is attenuated in a symmetrical manner from outside the light beam path to preserve illumination uniformity, and to utilize the central portion of the light beam which exhibits lower noise levels than outer portions thereof.

It is a still further object of the invention to achieve the correct illumination level with an aperture control system independent of a lamp current control system for regulating lamp caused noise and without the need for illumination level calibrations to aperture position.

These and other objects of the invention are realized in an illumination system for a film telecine scanner, of the type adapted to illuminate the image frames of a film and to scan the illuminated image frames and derive video image frame data within a predetermined frame scanning time interval, comprising an illumination light source which is adapted to provide a light beam along an optical path in said system, means located in the optical path for receiving the light from the light source and for illuminating the image frames of the film with diffuse uniform illumination, and means for measuring the intensity of light delivered to the film illuminating means and providing a measured light intensity signal, the illumination system having an improved illumination control apparatus further comprising: light control means located in the optical path for adjusting the amount of light that is delivered from the light source to said illuminating means and for providing an adjustment position signal; means for providing a commanded light intensity signal related to the film type and the illumination level of the scene captured in the image frames of the film; regulator means operable in a first state for selectively adjusting the light control means within the predetermined time interval in response to the commanded light intensity signal and the measured light intensity signal, and operable in a second state for maintaining the adjustment of the light control means in response to the position signal; and means for switching said regulator means from the first state to the second state when the adjustment of the light control means is completed and from the second state to the first state in response to a commanded light intensity signal.

Preferably, the illumination means provides a line of diffuse illumination on the image frames of a movie film which is supported for movement in a film gate of the scanner, and the illumination control apparatus further comprises: means for adjusting the intensity of the light emitted in the light beam by the light source; means for measuring the intensity of light delivered to the light integrating means and providing a measured light intensity signal; and means operable in the second state and responsive to the measured light intensity signal for adjusting the light output of the light source.

Preferably, the light control means further comprises: aperture defining means responsive to a drive signal generated by the regulator means and selectively locatable in a plurality of aperture defining positions with respect to the optical path for selectively decreasing or increasing the diameter of the light beam to interrupt more or less of the light beam and thereby selectively adjust the amount of light entering the image frame illuminating means.

In a further aspect of the invention, the regulator means further comprises: means operable in the first state for deriving the drive signal in response to an intensity error signal representing the difference between the commanded light intensity signal and the measured light intensity signal; and means for applying the drive signal to the aperture defining means until the aperture position set thereby adjusts the measured light intensity until the intensity error signal is driven to zero. In the derivation of the drive signal in this first state, further means are enabled for gain shaping the intensity error signal as a function of the instantaneous position signal. Further means are provided for summing gain shaped intensity error signal with an aperture speed signal. Still further means are provided for storing the aperture adjustment position signal.

Preferably, the aperture speed is derived by means for combining the high frequency portion of the load model estimated velocity with the low frequency portion of the derivative of the position signal to create a composite estimated aperture velocity signal.

During an illumination level change in the first state, the control system is thus preferably configured in a servo regulator configuration to move aperture blades of the aperture defining means in response to the drive signal in a direction to reduce the intensity error between the commanded and detected intensity levels to zero. The aperture blade drive signal is derived as a product of the intensity error signal, modified by an intensity gain value related to the current aperture position, and the aperture speed or velocity signal.

Further means, operable in the first state, are provided for: holding operating current to the illumination source lamp constant during an aperture position change; storing the final aperture position signal when the intensity error signal reaches zero for use in the second state between aperture changes; and enabling the transition to the second state when both the intensity error signal and the aperture speed are at zero.

In the second state, means are provided for: modulating the lamp current as a function of the intensity error signal for correcting lamp intensity fluctuations; comparing the instantaneous aperture adjustment position signal to the stored aperture position signal and the aperture speed and for providing a position error signal representative of the difference therebetween; and deriving a drive signal for operating the aperture defining means to minimize the position error signal.

During the second state, the control system is configured in a position servo regulator configuration to maintain the aperture blades of the aperture defining means in a position to reduce the error to zero between the position stored when intensity error reached zero and the actual current position, which may be affected by external disturbances.

In the absence of position disturbances in the second state, the aperture defining means preferably does not consume power, allowing maximum power capability to be used for intensity level adjustments by the motor. In both the first and second states, the aperture speed is derived and applied in the derivation of the blade drive current signal.

Advantages of the Invention

The present invention provides an improvement over the illumination systems described in the '346 and '596 patents. More specifically, the present invention provides an alternative light modulating control apparatus to the light controlling aperture wheel and a control system which can achieve the necessary regulation of light intensity to different scanned film types as well as adjust the intensity over a wide dynamic range to accommodate scene illumination changes, while maintaining illumination uniformity, lowering noise, and making a single level adjustment within the time allotted to scanning one film frame (nominally 33 milliseconds). During the transition frame scan, which is adversely affected by the change in illumination, the video system logic repeats the previous or succeeding frame in place of the transition frame to avoid perceivable flicker.

A principal advantage of this invention is the speed and accuracy in which an aperture change can be made in the source light beam entering the integrating cylinder of the telecine scanner. Adjustment of the blade mechanism from any aperture position to a new aperture position within the scanning time period of a single film frame may be achieved with $1/15$ F-stop aperture resolution. This motion performance is also consistent over the full dynamic range of illumination levels of the arc lamp through the assistance of intensity signal gain shaping and aperture shape. The control system of the present invention advantageously operates in conjunction with lamp current control used for arc flicker modulation between illumination level changes mandated by scene illumination changes in a manner to avoid control conflict. Between level changes, tight aperture position regulation is maintained, yet power consumption is low in the absence of disturbances allowing a higher duty cycle of level changes.

Changing the light intensity level in the light beam entering the integrating cylinder in accordance with the invention significantly increases the video S/N ratio over current methods utilizing video signal gain changes or electronic shutters in the sensor to compensate for scene light changes and allows a wide dynamic range of uniform lines of illumination.

BRIEF DESCRIPTION OF THE DRAWINGS

Other objects, features and advantages of the invention will become apparent upon reference to the following description of the preferred embodiments of the invention, in which:

FIG. 11 is a perspective view of the steel band employed in the apparatus of FIGS. 9 and 10.

DETAILED DESCRIPTION OF THE PREFERRED EMBODIMENTS OF THE PRESENT INVENTION

Figure 1:
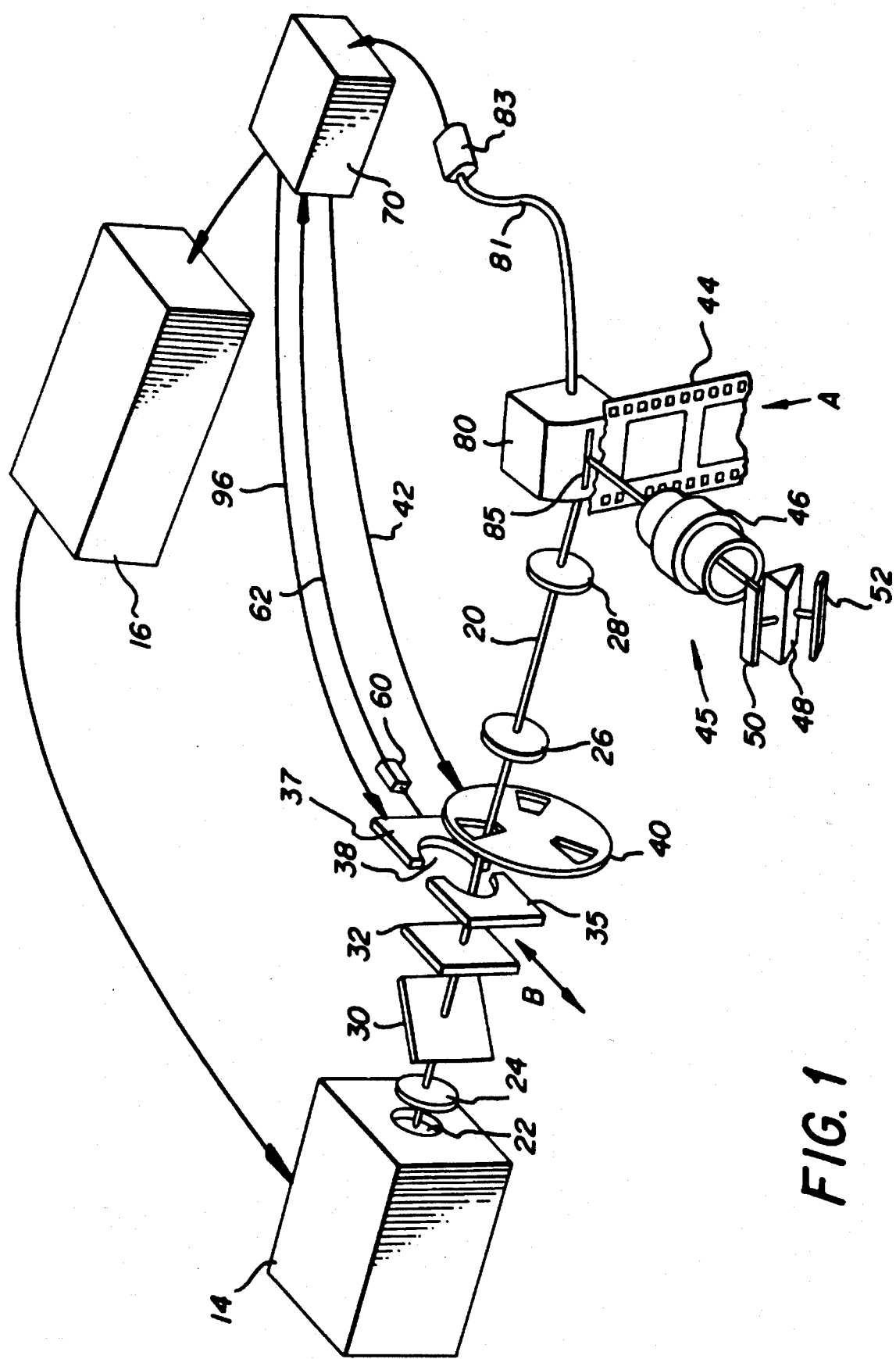
FIG. 1 is a simplified schematic perspective view of the components of the illumination control system of the invention in combination with certain elements of the telecine scanner.

Referring to FIG. 1, it depicts a simplified schematic perspective view of the components of one type of an illumination control system of the invention in combination with certain elements of the telecine scanner that are similar to FIG. 1 of the '596 patent and FIG. 11 of commonly assigned, U.S. Pat. No. 5,241,549 to Kaplan et al., both of which are incorporated herein by reference in their entireties.

The depicted illumination system includes a 300 W Cermax Xenon short arc lamp in a lamphouse 14 powered by a variable drive, linear power supply 16 that emits a light beam in an optical path 20 through a normally open shutter 22 and condensing lens 24. The light beam in the optical path 20 is shaped to be circular in cross section by a series of condensing lenses 24, 26 and 28 and filtered by pre-gate spectral filters 30 and 32 or a set of alternative filters described in the '596 patent for scanning positive or negative film types. A filter wheel 40 is interposed in the optical path 20 so that one of the three depicted sets of film-specific custom interference filters mounted in the wheel can be selected for calibration and for scanning of Eastman Color Negative and Eastman Color Positive films to effect proper color balance to the type of film scanned in a manner described in the above referenced SPIE article and the '379 patent. After calibration, if necessary, the selected filter set is positioned in the optical path for the duration of the telecine scanning operation in response to a signal from the illumination control system console 70.

In accordance with the present invention, an aperture defining mechanism 33, rapidly and precisely controllable to provide a plurality of aperture openings in a plurality of aperture defining positions, is provided in the optical path 20, preferably positioned midway between an aperture stop and a field stop with respect to the lenses 24 and 26. The preferred embodiment of the aperture defining mechanism 33 comprises a pair of movable blades 35 and 37 defining an aperture 39 centered in the optical path 20 that is operated to shape the light beam and modulate the beam power level in a manner to be described hereafter. A position sensor (not shown) provides a position signal to the illumination control system console 70, and the console 70 provides a drive current signal to the drive motor of the blades 35 and 37 in a manner to be described.

The light beam 21 passing through the aperture 39 in optical path 20 is filtered by the selected filter set in filter wheel 40, shaped by the condensing lenses 26 and 28 and directed into a light entrance port of integrating cylinder 80, which is preferably of the type described in detail in the above referenced '549 patent, but may be of the type described in the above referenced '346, '383 and '596 patents and SPIE article. The light integrating cylinder 80 has a light conducting rod or fiber 81 coupled to a feedback port thereof and to a photosensor 83 which in turn is coupled to a current-to-voltage circuit within console 70 for developing a measured light intensity signal of light within the cavity of the integrating cylinder 80. The measured illumination level is converted to a current value by the photosensor 83 that is in turn converted to a voltage value of the measured light intensity signal.

The integrating cylinder 80 of FIG. 1 is preferably tilted with respect to the optical path 20 and constructed with an end entrance port (obstructed from view) for admitting the light beam 21. The light beam 21 is carefully adjusted for its angular divergence and its angular orientation relative to the axis and physical characteristics of the integrating cylinder 80 so as to provide uniform light output through the linear exit port 85. The admitted light beam 21 is reflected within the integrating cylinder and exits the linear exit port 85 as a narrow line of intense, diffuse light which falls on the image frames of movie film 44 transported past the exit port 85 in the direction "A".

The line of light is modulated in color and intensity by the image dye color and density, and the modulated line is directed to a pickup stage 45. A projection lens 46 directs the line of light onto a beam splitter 48, including a dichroic filter, which splits the so modulated line image into chrominance and luminance or detail line images directed on respective pickup devices 50 and 52. Pickup devices 50 and 52 are preferably a set of three color filtered CCD linear arrays for providing three color video line chrominance signals and a single CCD linear array, respectively, for providing video raster line luminance signals as described in the '346 and '379 patents and the SPIE article, although alternate CCD array systems may be substituted.

The HDTV telecine conversion system, for which the illumination system of FIG. 1 is intended to be used, is designed to accommodate a wide range of movie film types, as itemized in Table I of the '596 patent. The variation in format, perforations, and speed translate into differences in the integration time of the CCD elements of the linear arrays 50 and 52 and thus into differences in illumination (power) level necessary. The Xenon short arc lamphouse 14 can be modulated to different power levels. However, as lamp power is decreased below normal operating levels, the noise (light flicker) emitted increases as the average light output decreases. As described in the '596 patent, the S/N levels of the output source (the line of illumination at the aperture 85 of the light integrating cylinder 80) must be separated by better than 50 db to avoid flicker artifacts in the video image. Also as lamp power is increased above the normal operating range to enhance the S/N level, lamp life is shortened.

Thus, modulation of lamp current is limited to regulating power level in a narrow operating range that can be employed to respond to low frequency, low magnitude level disturbances primarily caused by lamp arc flicker. This control is accomplished by comparing the measured illumination level in the integrating cylinder to the desired level and using the error value to drive the variable lamp power supply toward zero error in a classic servo regulator configuration.

Figure 2:
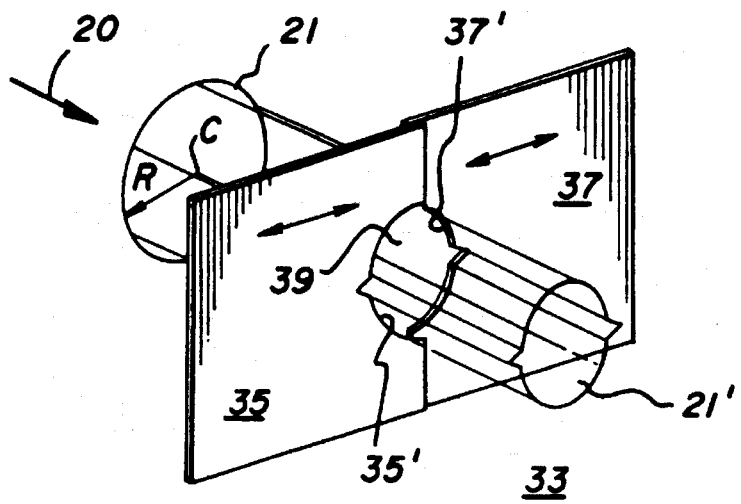
FIG. 2 is a sketch of the light beam aperture defining mechanism employed in FIG. 1.

To achieve wide dynamic range of illumination, the light beam obstructing blades 35 and 37 are inserted into the optical path 20 as shown in enlarged detail in FIG. 2 in place of the aperture wheel described in the '596 patent. These thin blades 35 and 37 are carefully located nearly in a single plane and at a location along the optical path 20 midway between an aperture stop and a field stop plane prior to the integrating cylinder 80 and between lenses 24 and 26. This insures that beam reflection angles in the integrating cylinder 80 of the type described in the above-incorporated '549 patent are minimally affected. In the other alternative embodiments employing the light integrating cylinders of the above referenced '596 patent and *SPIE* article, placement of the blades is not as sensitive.

Figure 9:
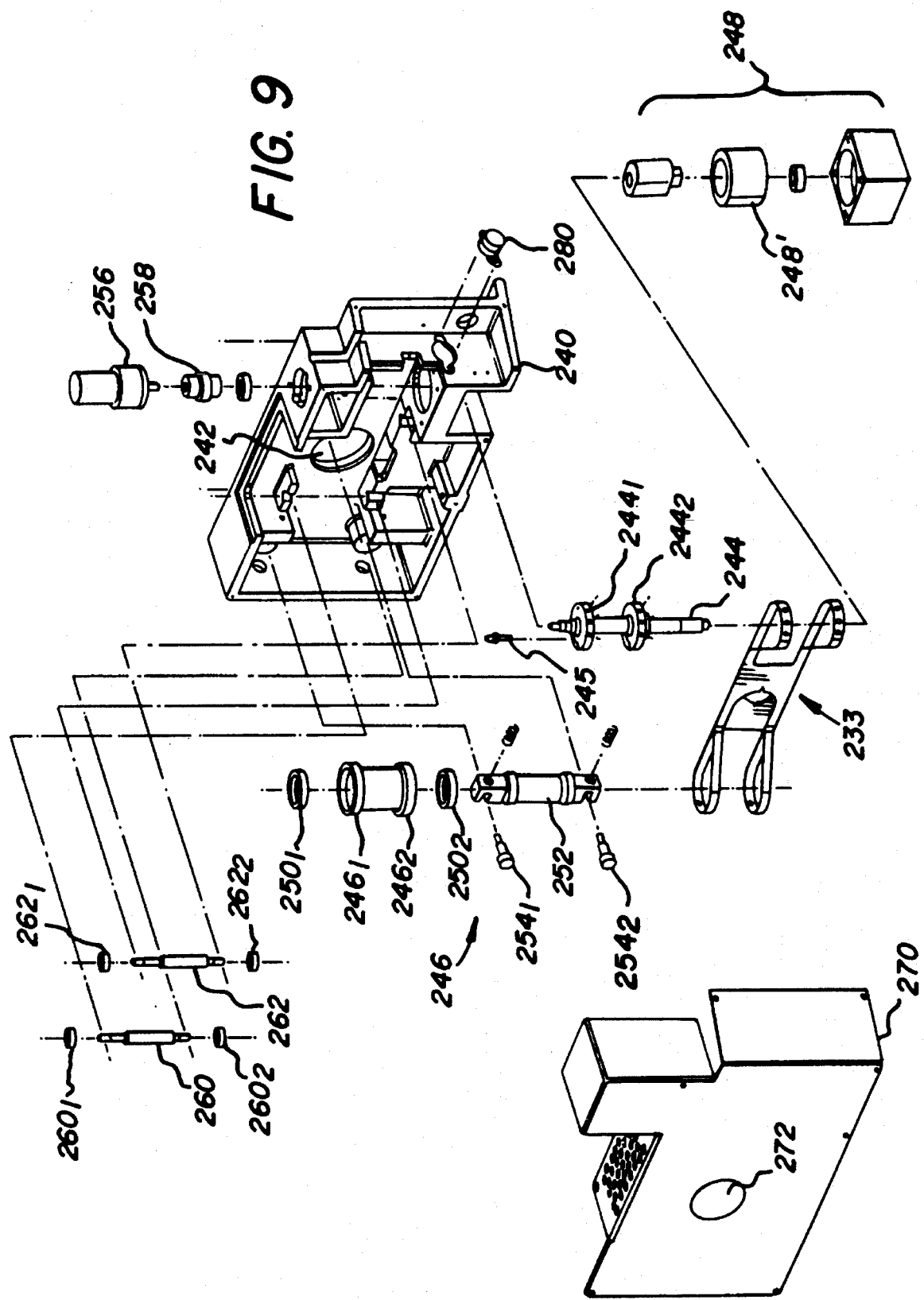
FIG. 9 is an exploded isometric view of the components of the aperture setting apparatus of a preferred embodiment of the invention.
Figure 10:
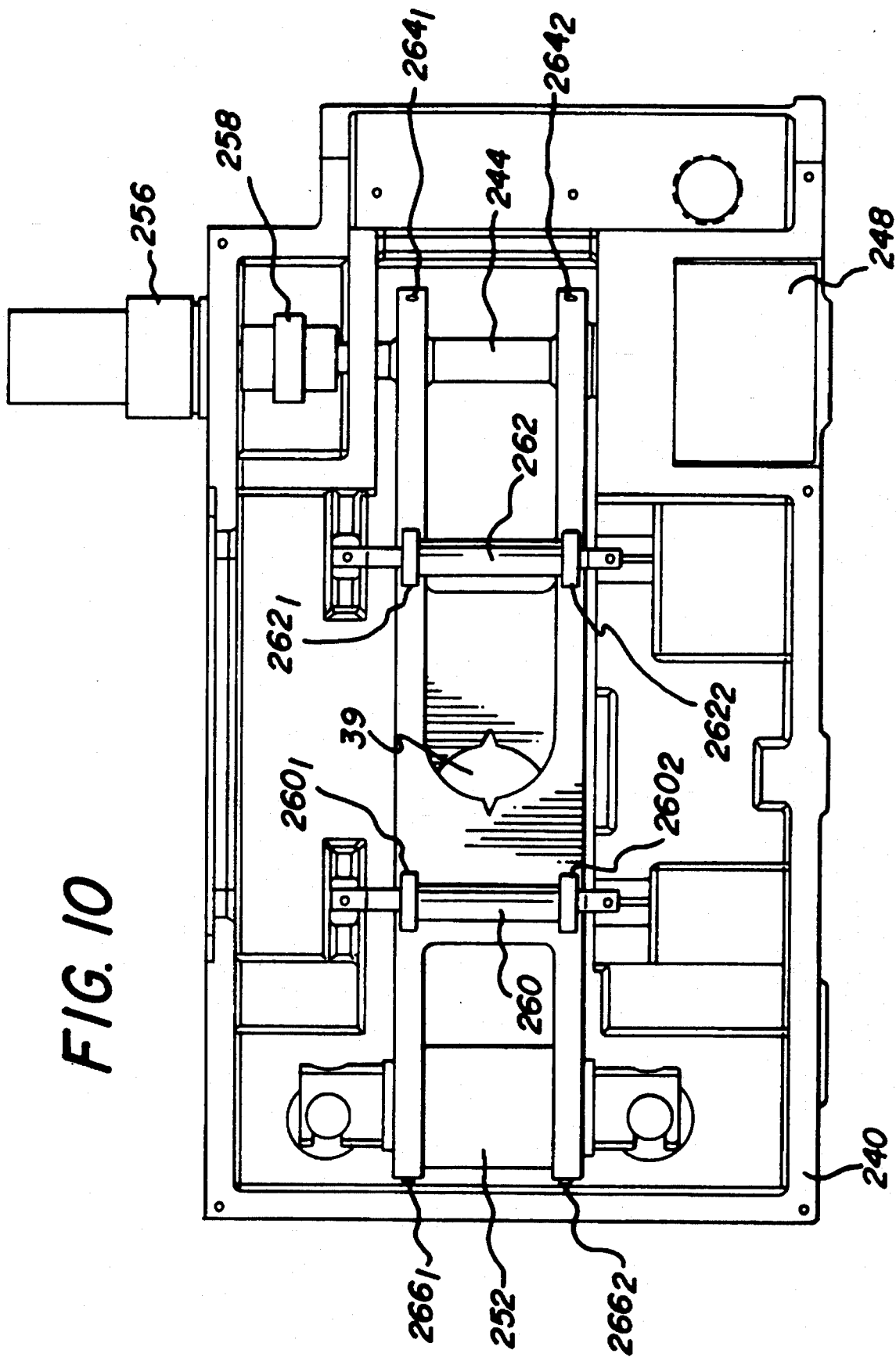
FIG. 10 is a front view of the components of FIG. 9 assembled without the front cover in place.

At this point in the optical path 20, the light beam 21 is nearly circular in cross section and has a nominal diameter established by the lens system. The blades 35 and 37, operated by a mechanism described hereafter with respect to FIGS. 9–11, are moved inward or outward preferably in a horizontal direction indicated by the arrow "B" simultaneously to shape and decrease or increase the diameter of the light beam passing through the aperture 39. The symmetric elliptical and "V"-shaped cut-out blade openings 35' and 37' defining the aperture 39 move symmetrically in mirror image relation relative to each other to cut the light beam 21 equally from both sides. This preserves the low noise, center light beam characteristic and helps to maintain lengthwise uniformity of light output of the integrating cylinder slit in all of the aperture positions. Moreover, as the aperture 39 is closed, it closes more slowly in the vertical direction than the horizontal direction, preserving vertical light similar to the closure of the iris of a cat's eye. This minimally affects the uniformity of light output at the elongated exit port 85 of the light integrating cylinder 80.

The blades 35 and 37 are low in mass and driven by a high performance motor (not shown) in the direction of arrow "B" to allow fast changes in position comparable to film frame scanning rates. By providing near real time illumination control in the telecine system to adjust illumination level within one film frame scanning interval, the video system can substitute the scanned image frame data of the previous or succeeding frame in place of the transition frame. Illumination levels can thus be changed without the need to stop the film transport system and can also avoid the creation of a video image with a visible transitioning light level. The real time blade control is effected by the motor and drive, and the position sensor 60 provides absolute position information for use in the blade control. The preferred embodiment of a motor driven, beam obstructing mechanism 33 is described hereafter and in the commonly assigned U.S. Pat. No. 5,414,460, referenced first above.

Control of the position of the blades 35 and 37 is accomplished using a continuous control scheme configured as a servo regulator. In this scheme, the parameter to be controlled is fed back with proper polarity and compared to a reference level for that parameter. The error between reference and feedback becomes the drive signal to the blade power stage with signal polarities designed to always apply force in the direction to reduce error to zero. The strength and stability of the drive force to zero the error is determined by error signal gain and is termed "proportional error".

Derivative and integral action on the error signal can be added to achieve a variety of dynamic responses. Consistent dynamic response is thus determined by the non-variance and linearity of the system gain elements that determine total error signal gain.

In this invention, two feedback signals representing the control parameters "intensity level" and "blade position" are employed in servo regulation with respect to corresponding illumination level and blade position reference values. Illumination intensity error and position error signals are derived which are respectively gain shaped by respective intensity and position gain signals. The intensity gain signal is non-linear and varies as a function of aperture position as described below with reference to FIG. 7. The position gain signal is a fixed, linear amplification factor applied to the position error signal in order to achieve desired dynamic response.

Since the two control parameters are not independently controllable, simultaneous servo regulator control would conflict. This is avoided by always setting either intensity gain or position gain to zero, effectively disabling the respective servo regulator, during differing states of operation.

Figure 3:
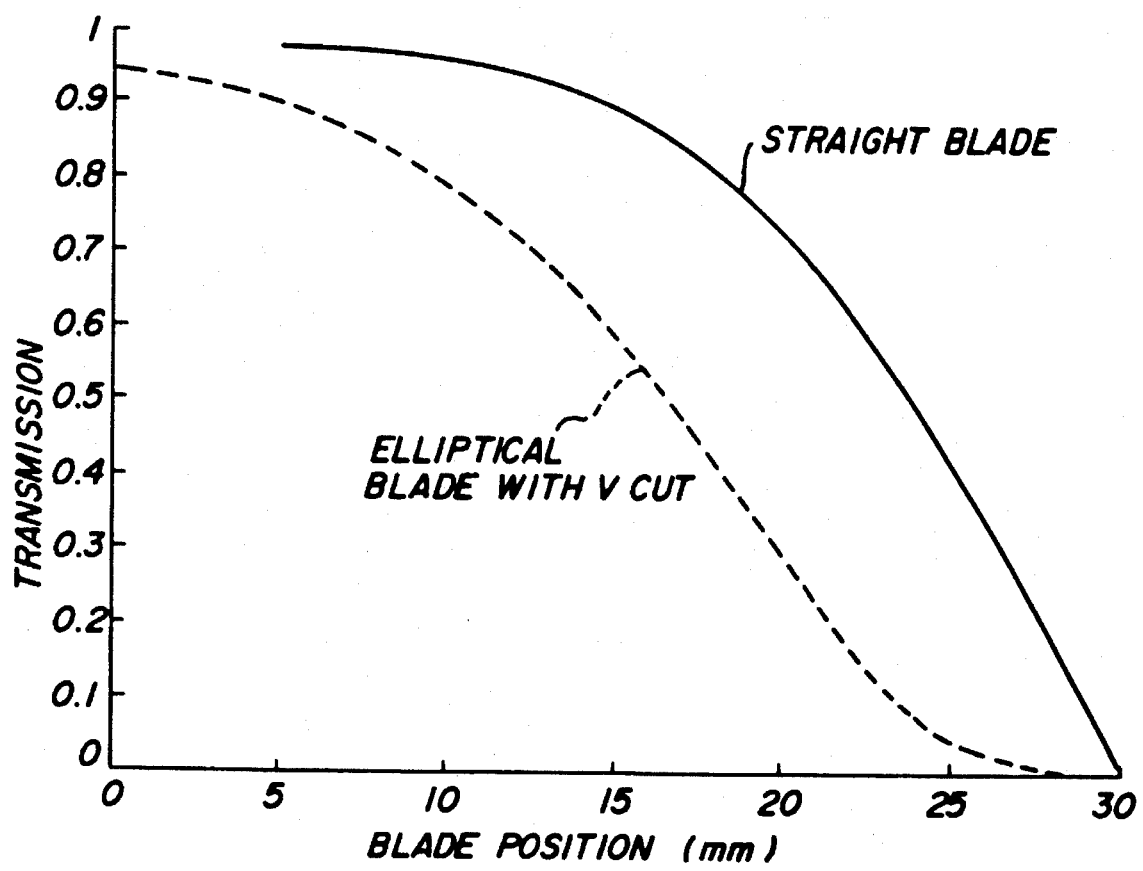
FIG. 3 is data plotted to show the transmission versus blade opening characteristics of a pair of straight blade edges compared with the pair of elliptical shaped blade edge openings with a center "V" cut therein of FIG. 2.

The near Gaussian nature of the beam power level from point to point outward from its center C and along its radius R creates a very non-linear relationship between change in beam power level transmission through the aperture versus aperture position change as depicted in the curves of FIG. 3. The transmission curves depicted are derived given the Xenon lamp Gaussian beam power distribution and are shown as a function of blade position which increases in value with each blade moving equally from outside the beam toward the center C.

The transmission characteristics of a pair of blades with straight beam intercepting edges (i.e., without the openings 35' and 37' and similar conceptually to the spiral opening of the aperture wheel of the '596 patent) is shown in the solid line curve in FIG. 3. This transmission curve exhibits a very large change in intensity gain as blade position changes, where such intensity gain is defined as the incremental change in illumination level versus change in blade position. The straight edge shape also provides a very high sensitivity of beam intensity change to blade position in the low transmission operating region (i.e. nearing totally closed aperture), especially when measured in the F-stop, or logarithmic, domain.

In accordance with a preferred embodiment of the invention, the aperture opening 39 of the blades 35 and 37 is shaped to improve o-r lower the ratio of maximum to minimum intensity gain. Also, the shape improves resolution by lowering the sensitivity to aperture position errors in the low transmission region, i.e., near the fully closed blade position. The dotted line curve of FIG. 3 shows the transmission characteristics of the pair of elliptical shaped and center "V" cut blade openings 35', 37'. This curve is somewhat more linear and exhibits a lower intensity gain in the low transmission region. However, the shaping of the blade openings 35', 37' is not fully effective in eliminating the non-linearity of intensity gain with respect to aperture position.

Figure 4:
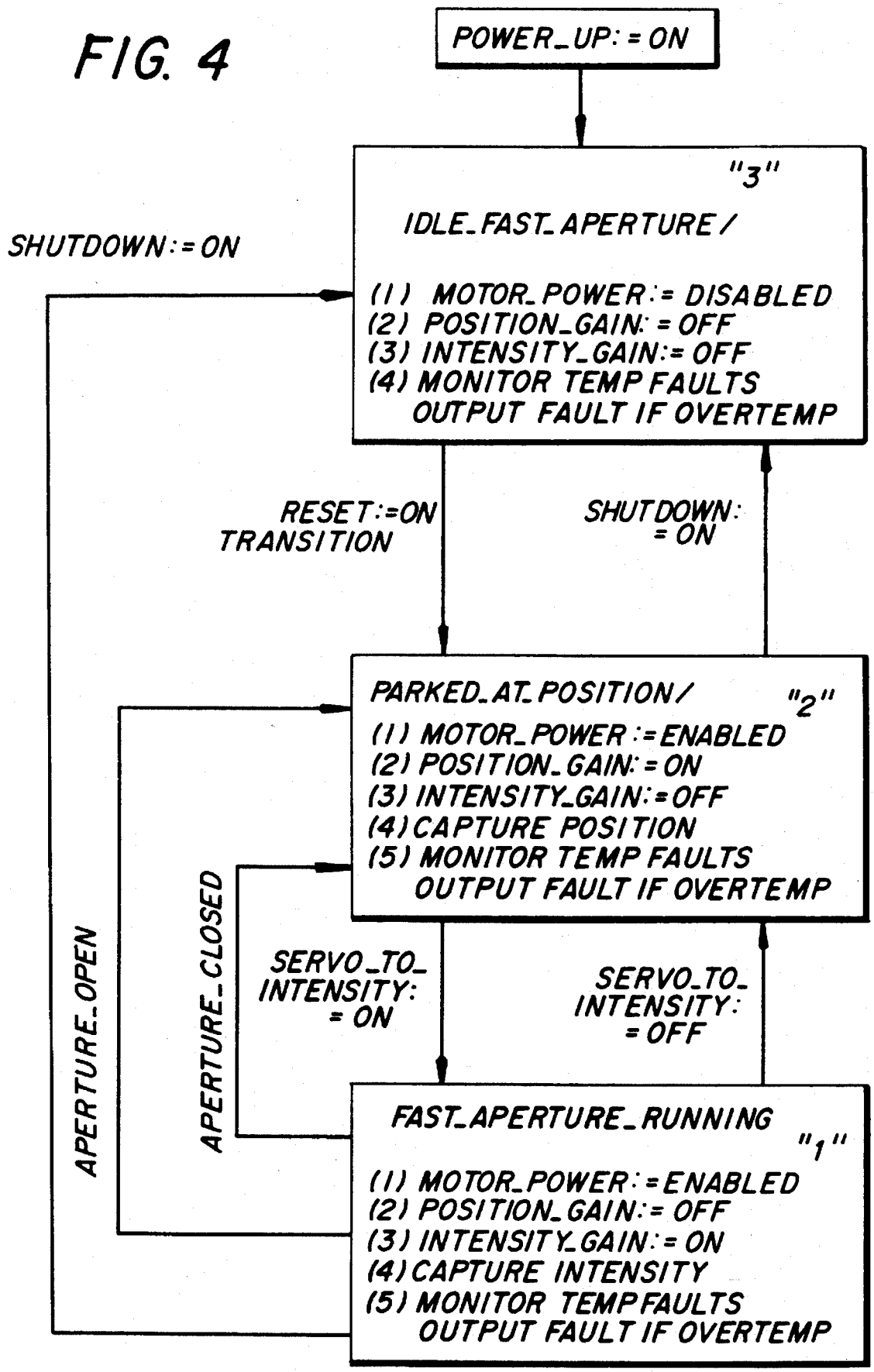
FIG. 4 is a logic state diagram showing the highest level control states of the aperture and lamp intensity illumination control system of FIG. 1.

Turning now to the illumination control system employing the aperture blade mechanism, the servo control system for the setting and changing the aperture positions can exist in one of three logic states depicted in the state diagram of FIG. 4. Control state "3" of the illumination control system is an "idle" or zero energy state for service and maintenance.

All aperture control is inactive, and the blade mechanism motor can be energized from this position in a consistent, predictable manner upon entering control state "2". Control state 2 is the "parked" or holding logic state governing control of aperture position between illumination level changes and is the state entered into upon reset from state 3. Control state "1" is the transition or "running" logic state governing control of blade motion to a new intensity level and is entered into on a discrete logic signal from the illumination control system.

The operating conditions for each state are listed in each state block. The transitions between states are marked by the various commands controlling change in operation in each state and will be understood to control operation of the system of FIGS. 5 and 6 in reference to FIGS. 7 and 8. The transitions between and the operation in control states 2 and 1 are of particular interest in the operation of the control system depicted in FIGS. 5 and 6.

Figure 5:
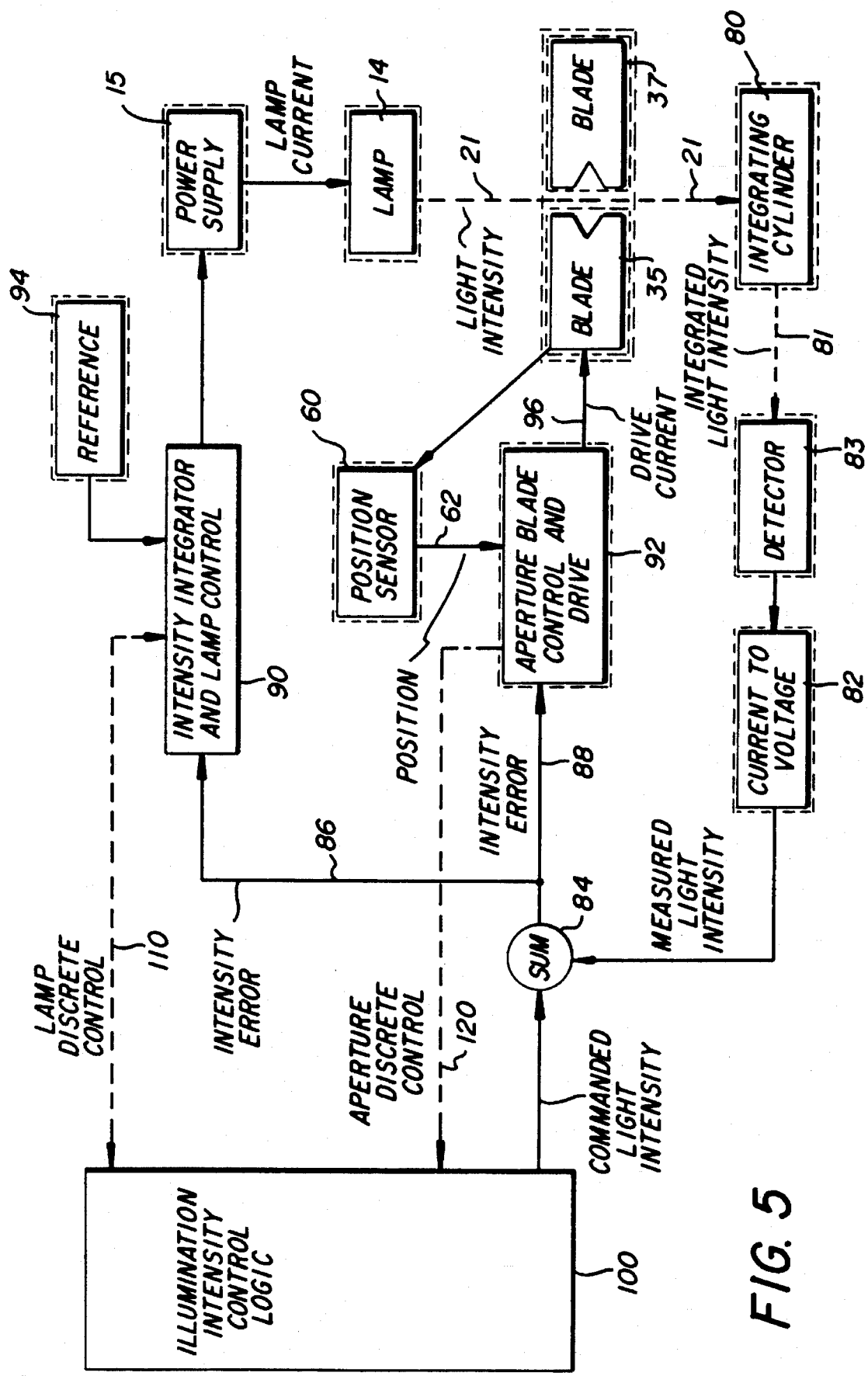
FIG. 5 is a high level block diagram of tile aperture and lamp control system within the illumination system.

FIG. 5 shows a high level schematic diagram view of the aperture control system within the illumination control system. As described above in respect to FIG. 1, the Xenon arc lamphouse 14 supplies a light beam 21, through the aperture 39 formed by the aperture position of the leading edges of blades 35 and 37, to the integrating cylinder 80 for film illumination. A portion of the light within the integrating cylinder 80 is fed by the optical fiber 81 to the photo detector 83 which provides a current signal that is converted to a voltage proportional to "measured light intensity" by current-to-voltage conversion circuit 82. The light intensity voltage level is compared in summation or comparison circuit 84 with a reference voltage proportional to "commanded light intensity" to create an "intensity error" signal representing the difference between the two signals. During state 1, the intensity error signal is driven to a certain value, e.g. zero, by adjustment of the aperture blade position in response to a "drive current" until the measured light intensity equals the commanded light intensity.

The illumination intensity and control logic 100 provides the commanded light intensity signal that is related to the film type and to the scene change commands stored in reference to the film image frames in the earlier film review described above. Thus, the currently scanned image frame count is tracked and compared to the stored scene change image frame numbers and a new commanded light intensity signal is provided while the control system is in state 2. At the same time, the "lamp discrete control" signal set on intensity command and control line 110 and the aperture discrete control signal set on aperture command and control line 120 are changed in the manner depicted in FIG. 4 as the state changes to state 1. In the interval of one film frame scan (nominally 33 milliseconds), the new aperture opening position is achieved and the absolute blade position captured (stored) in aperture blade control and drive block 92. The scanned HDTV image frame data set for the transition video frame may be separately stored or discarded, and either the preceding or succeeding scanned image frame data set so that the transitory light changes are not visible as flicker.

The intensity error signal is applied on lines 86 and 88 to both the intensity integrator and lamp current control circuit 90 and the aperture blade control and drive circuit 92; however, only one of the control circuits 90 or 92 will be activated to provide a controlled response to the intensity error signal in any given state of operation as indicated in FIG. 4.

In parked state 2, while lamp control is active, the power supply 15 to the lamp 14 is driven by the intensity integrator and lamp control 90 to modulate lamp current developed by the power supply 15 around the nominal operating value (e.g. 18 amps) set by the reference voltage 94 in order to reduce the integral of the intensity error signal to zero. Simultaneously, but separately, the aperture blade control and drive circuit 92 utilizes the blade position sensor information or "position" signal on line 62 to counter disturbances in blade position which may arise from shock, vibration or drift in the blade position so that it remains at the aperture position previously set in state 1 in a manner to be described.

In running state 1, governing the change of aperture position and resultant illumination level in response to a new commanded light intensity signal, modulating lamp current to maintain intensity and suppress lamp noise is suspended. Lamp current is set by the reference voltage block 94, because lamp current control and aperture control would otherwise both attempt to control the intensity of the light beam 21 entering the integrating cylinder 80. The intensity error signal and aperture blade control and drive circuit 92 are configured in a servo regulator configuration to drive the blades 35 and 37 in a direction to reduce the intensity error signal to zero. Position error gain is reduced to zero in state 1, so as not to provide any controlling action.

As described hereafter, the aperture setting mechanism 33 is preferably of a type which does not consume or require a "holding" drive current to maintain the aperture position in parked state 2. This allows a wide dynamic range of operation in response to applied drive current which is particularly useful in state 1 transitions. Moreover, the drive motor of the aperture setting mechanism 33 is thereby not subjected to thermal loading which may lower the duty cycle or frequency of state changes.

The aperture setting mechanism 33 and particularly the blades 35 and 37 will exhibit a "blade velocity" or "aperture speed" in responding to the drive current applied to achieve a new aperture position in state 1 and maintain the position in state 2. The aperture speed is derived in aperture blade control and drive circuit 92.

Figure 6:
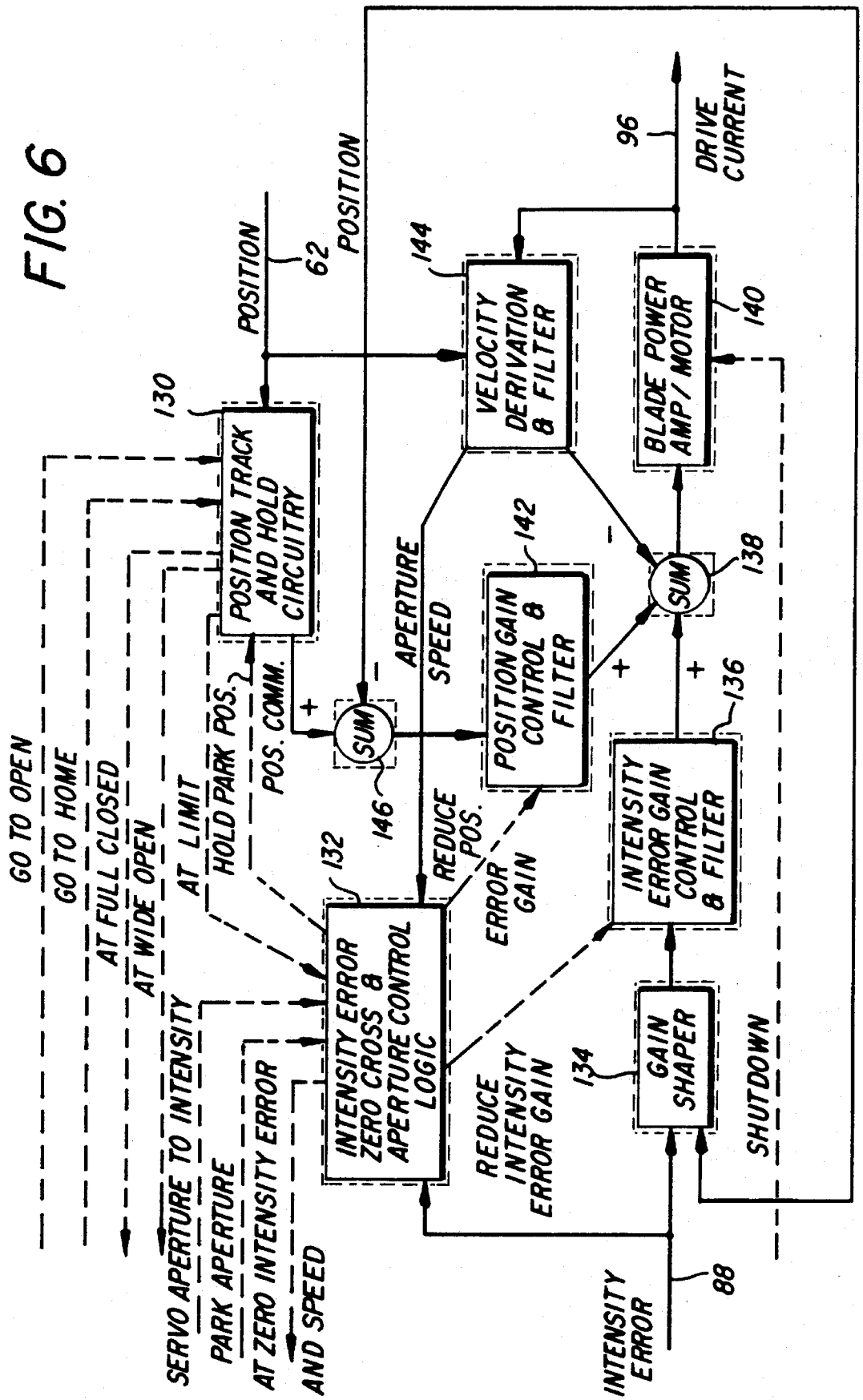
FIG. 6 is a more detailed block diagram view of the aperture blade control and drive block of FIG. 5.
Figure 7:
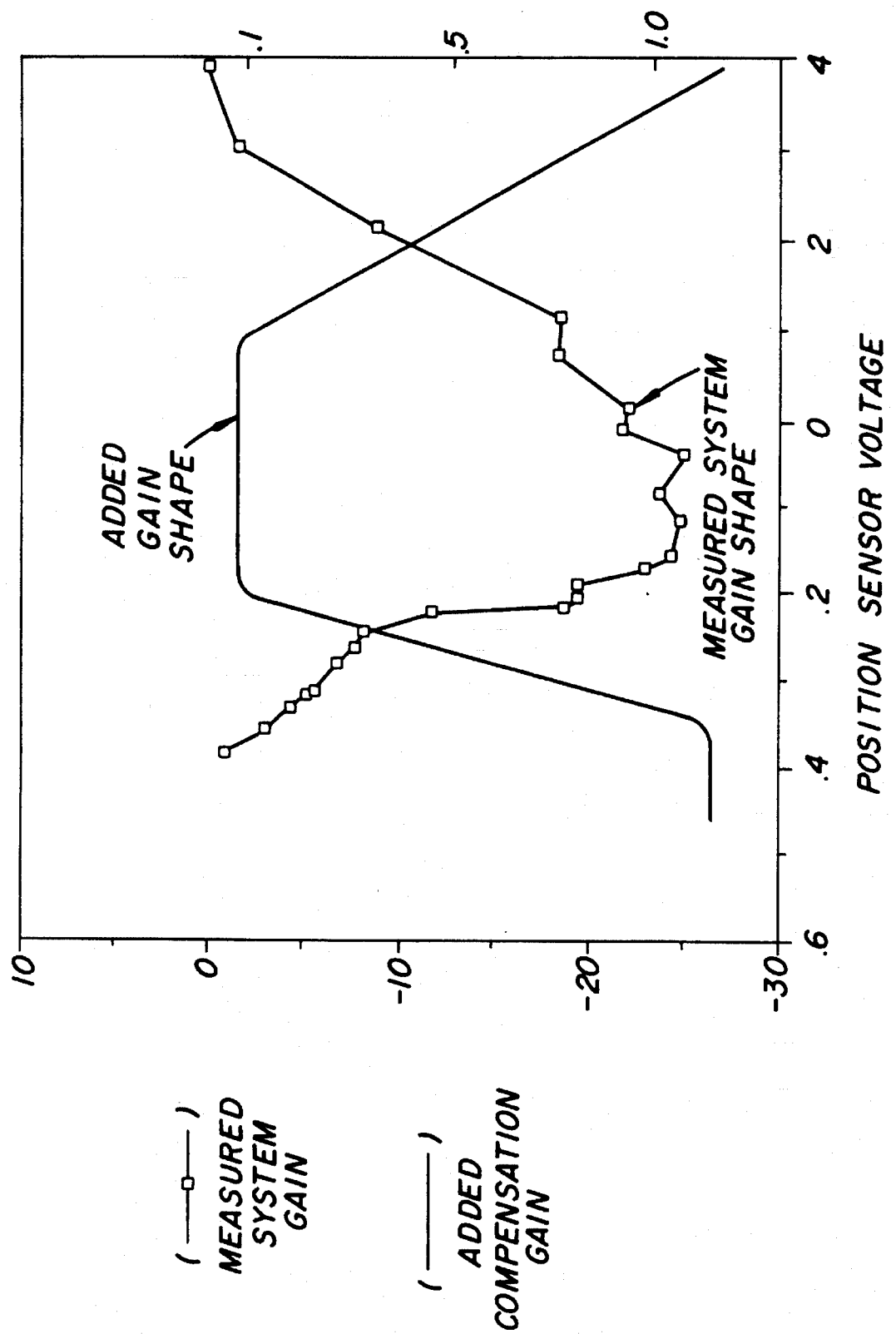
FIG. 7 is the measured system intensity gain versus blade position and the inverse compensation gain versus blade position employed to compensate for the measured intensity error gain in the aperture control system.
Figure 8:
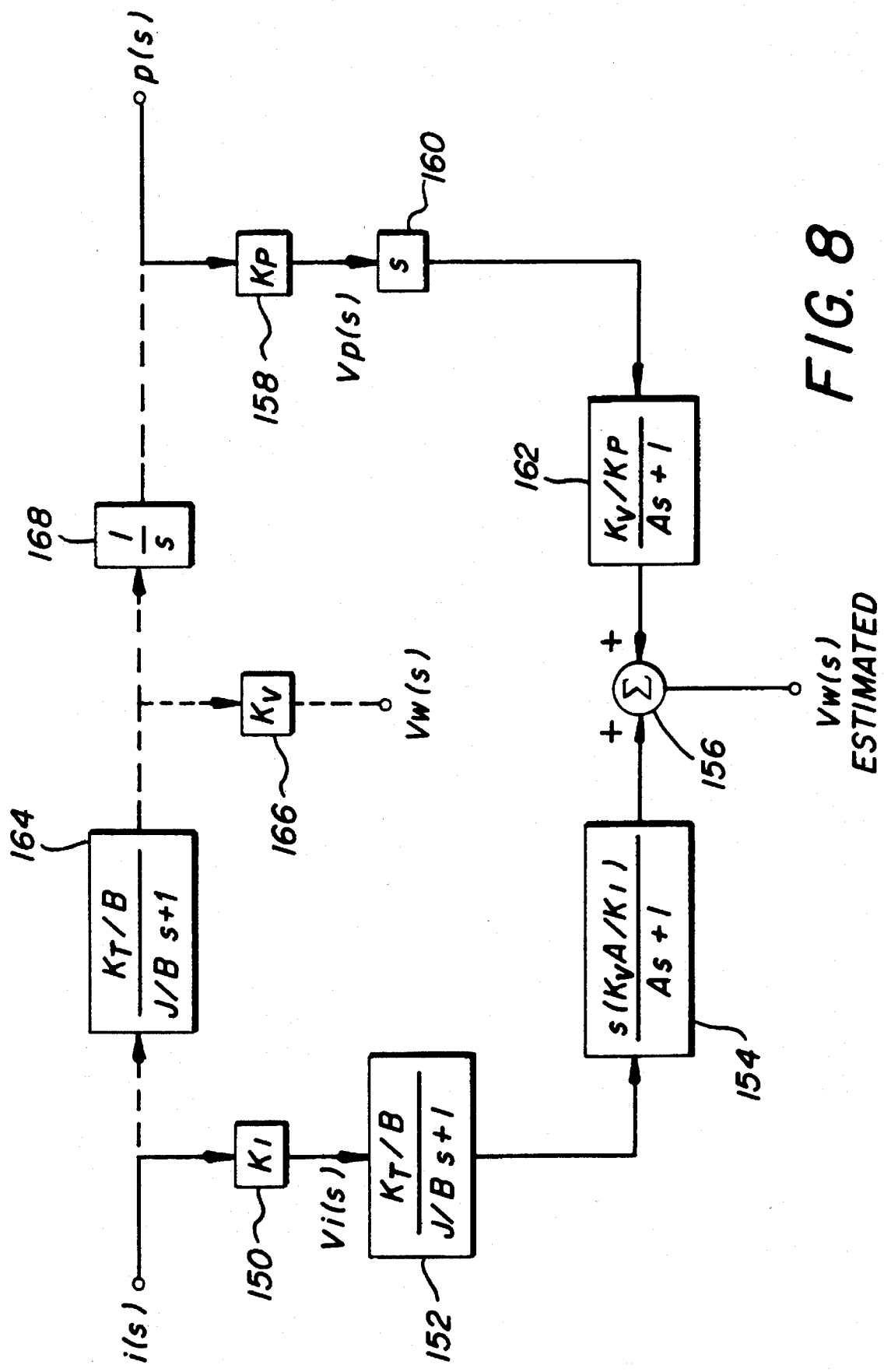
FIG. 8 depicts the derivation of a blade velocity signal from a combination of blade position and blade drive current signals for use in the intensity and blade position control algorithm.

FIG. 6 is a more detailed schematic diagram of the aperture blade control and drive circuit 92 that provides the drive current signal on line 96 through the processing of the intensity error and position signals employing the added intensity gain of FIG. 7 and the aperture speed or velocity filter algorithm of FIG. 8. In FIG. 6, the variable, analog signals are directed between the operational blocks on solid lines, and the discrete command and control signals are directed between blocks and the illumination intensity control logic 100 on dotted lines. The command and control signals "go to open", "go to closed", "at full closed", and "at full open" are provided between the position track and hold block 130 and the illumination intensity control logic 100 and are part of the "aperture discrete control" signal set 120 of FIG. 5. The "go to open" and "go to closed" command and control signals are employed as startup or test positions and set the extremes of aperture opening. The "at full closed" and "at full open" signals provide feedback of achievement or errors in achieving a desired aperture.

Similarly, the command and control signals "servo aperture to intensity", "park aperture" and "at zero intensity error and speed", provided between the intensity error zero cross and discrete aperture control logic 132 and the illumination intensity control logic 100, are part of the "aperture discrete control" signal set. The "park aperture" signal is employed in state 2 in conjunction with the "hold park position" signal applied by control logic 132 to position track and hold block 130. The "servo aperture to intensity" signal enables state 1 operations, particularly by setting intensity gain "on". The "at zero intensity error and speed" signal provides feedback to the illumination intensity and control logic 100 that the changeover to the new aperture position during state 1 is complete and enables state change back to state 2 by delivering the "park aperture" signal to the intensity error zero cross and aperture control logic 132. A "shutdown" signal may also be applied to the blade power amp/motor block 140 as part of the "aperture discrete control" signal set when the control system is in state 3 as shown in FIG. 4.

The control logic 132 thus responds to the control and command signals and the intensity error and aperture speed signals to provide the "reduce position error gain" signal to the position gain control and filter 142 during states 1 and 3 and the "reduce intensity error gain" signals to the intensity error gain control and filter 136 during states 2 and 3, respectively, to effectively disable the operations of these feedback loops in these states. The value of the aperture speed signal applied to control logic 132 is employed to verify that the aperture blade mechanism has come to rest at the new aperture and to enable the transition to state 2. To move to state 2, the intensity error signal and the aperture speed signal must both be reduced to a certain value, e.g. zero.

The intensity error signal is applied on line 88 to both the intensity error zero cross and discrete aperture control logic 132 and the gain shaper 134. The gain shaper 134 shapes the intensity error signal by multiplying it (using an analog multiplier integrated circuit) by a signal representing the aperture position dependent, inverse aperture gain function (as shown in FIG. 7) and applying the product to the intensity error gain control and filter 136. The filtered and shaped intensity error signal is applied to summation block 138, if block 136 is not disabled by a "reduce intensity error gain" control signal from logic 132 during state 2.

As mentioned above, the highly Gaussian nature of the illumination distribution radially in the light beam 21 creates a very non-linear relationship between change in beam power or intensity versus aperture position change. This non-linearity creates a non-linear gain element in the servo regulator or control system configuration and thus makes consistent servo performance over the range of travel of the blades 35 and 37, and the aperture positions defined thereby, unattainable. In fact, position gain changes of 20:1 may be seen which, without further compensation of some kind, causes blade position control based solely on the value of the intensity error signal on line 88 and the position signal on line 62 to fail to provide the proper illumination level within one film frame scanning interval at the worst case aperture positions. Thus, servo regulator control based on these unprocessed signals is unacceptable.

Our solution to the non-linear regulator problem described above is to shape the intensity error proportional servo gain which is set in intensity gain shaper 134 to be the approximate inverse function of the non-linear, beam and blade combination, measured system intensity gain as shown in FIG. 7. In practice, the servo gain shape is created by applying a linear, three piece approximation to the measured system gain shape as shown in FIG. 7, and implementation of that shape is done with a simple analog circuit in block 134 of FIG. 6. Since the beam intensity non-linearity with respect to blade position is contained in the intensity error signal, and the intensity error signal is multiplied by the inversely shaped intensity error proportional servo gain as shown in gain shaper 134, the product can be made near constant. This cancellation has the effect of returning the control system sufficiently close to a linear regulator control to enable the achievement of a new illumination level aperture within one film frame scanning interval from any prior aperture position. This intensity gain shaping is enabled during running state 1, and makes a first use of the blade position signal developed by sensor 60, since the intensity non-linearity, and thus the measured and servo gain shape functions, are both a function of position.

During state 1, the blade position signal is also used in regulating the movement of the aperture blades 35, 37 by the motor in relation to the aperture speed or velocity as the blades are moving to a new aperture position. Velocity Derivation Block 144 receives both the drive current and position signals to develop the aperture speed signal, which varies in magnitude as blade aperture position is changed. The comparison block 138 receives the shaped intensity error signal from block 136 and the aperture speed signal from the velocity derivation and filter block 144, and the subtracted output signal is applied to a blade power amplifier and motor block 140. Blocks 144, 138 and 140 operate as a speed control loop during running state 1 (and also during parked state 2 described hereafter).

The fast and accurate requirements of illumination change within the scanning time period of a film frame necessitates high bandwidth performance with good disturbance rejection and low sensitivity to system parameter tolerances and component variations. These features are realized with the application of the speed control loop. The moving aperture blade speed, or velocity, can be obtained from the addition of a velocity sensor, can be derived from change in blade position information (derivative), and can also be derived from the motor current by estimating the speed using a model of the load dynamics. Whatever means is used to obtain aperture speed, using the same speed control loop for both intensity control and position control in states 1 and 2, respectively, advantageously reduces switching transients, since the speed control loop is active and initialized correctly on a change in control state.

The preferred method of speed derivation is to create a velocity signal by combining the high frequency portion of the load model estimated velocity with the low frequency portion of the derivative of the position signal to create a composite estimated aperture velocity signal $Vw(s)$ Estimated in the manner shown in frequency domain computation blocks 150–162 shown in FIG. 8, which are implemented in analog circuits in block 144 in FIG. 6. FIG. 8 also depicts, in the dotted lines and blocks 164–166, a frequency domain, imaginary representation or model expressed in mathematical terms of how the aperture control mechanism 33, particularly the mechanism of FIGS. 9–11, converts a drive current $i(s)$ into a position $p(s)$ and how a velocity sensor would derive an actual velocity $Vw(s)$, if one were employed.

As stated above, an actual velocity signal $Vw(s)$ could be derived from a velocity sensor mounted to the moving blade drive mechanism as shown in the imaginary path including blocks 164–168 depicted in FIG. 8. Block 164 represents the actual response of the system which is emulated as a filter in the velocity estimator filter block 152. Block 166 represents an actual velocity sensor having a response function corresponding to the factor $K_v$ which develops an actual velocity signal $Vw(s)$. Block 168 represents the transformation of the velocity to instantaneous position $p(s)$.

However, for the reasons stated above, it is preferred to derive the composite estimated velocity signal $Vw(s)$ Estimated from the motor drive current $i(s)$ (amps) and the position signal p(s) (an angle of rotation expressed in radians). The motor drive current i(s) is converted to a voltage Vi(s) by the current sensor $K_I$ (a resistor) in block 150, and the position signal p(s) is converted to a voltage Vp(s) in block 158 (block 158 may take the form of the position sensor 60). The signal Vi(s) is applied to a velocity estimator filter block 152 which operates on the simple load model formula consisting of the motor torque constant $K_T$ (in-oz/Amp), load inertia J (oz-in-sec$_2$) and windage B (oz-in/rad/sec) components. The product is applied to a high pass filter block 154, with filter elements determined by inertia and windage as well as the desired velocity sensor target coefficient $K_v$ (volts/rad/sec), the high and low pass filter cut-off value A (1/rad/sec), and the current sensor coefficient $K_I$ (volts/amp).

The derivative represented by the Laplace transform s of the position signal Vp(s) is obtained in block 160 and applied to the low pass filter block 162. Low pass filter block 162 operates in accordance with the depicted formula, wherein the position sensor coefficient $K_p$ (volts/rad) is combined with above identified coefficients and values, to develop a position related signal which is applied to the summation block 156. The resulting velocity signal Vw(s) Estimated is applied to the summation block 138 and to the control logic 132 in FIG. 6.

A disadvantage of velocity estimation from motor drive current i(s) is that it tends to be inaccurate at low frequency and at steady state levels due to system friction and constant load force disturbances. Anything which would require a holding current would incorrectly show up as a velocity. These disadvantages are avoided using the composite velocity signal Vw(s) Estimated derivation as described above as long as the signals being summed in block 156 are properly matched in gain.

Thus, while operating in running state 1, the intensity gain function is enabled and the blade position is changed in response to both the intensity error and position signals. During running state 1, the position signal is also applied to the position track and hold block 130 which digitizes and stores the final position signal p(s) in memory. At the transition to parked state 2, in response to a "hold park position" command from block 132, the stored absolute position signal is retrieved and converted to analog form as the "position command" and compared to the current position signal in summation block 146 to develop a position error signal applied to the position gain control and filter block 142. But, for effecting a fully open or fully closed initial or test aperture, the actual sensed aperture position is compared to the "go to open" or "go to home" values stored in position track and hold circuit 130.

Before resuming lamp current modulation in parked state 2 after a level change from state 1, blade control must be moved to the second control state 2 which will no longer regulate intensity error but will maintain the "zero" intensity error position as a nominal position and reject disturbances to remain there. This is accomplished by the control logic 132 which provides the "hold park position" command to the position track and hold block 130 to store the absolute position (with intensity error and aperture speed at zero) and switches to a position servo regulator loop configuration by enabling position gain control and filter 142. Intensity error gain in intensity error gain control and filter 136 is reduced to zero in this state which effectively disables it.

While operating in state 2, drive current should be normally at zero or at a level which is incapable of overcoming any resistance to movement of the blades in the aperture control mechanism 33. However, the position command signal is continuously compared to the instantaneous absolute position from the position sensor to create a position error signal if there is any disturbance in position. The position error signal is applied to position gain control and filter 142 which amplifies the signal to a level to achieve the desired dynamic response and to commence blade movement. Position error is thus driven toward zero in the position regulator configuration. In other words, the filtered position error signal is compared in comparison block 138 with the aperture speed signal from block 144, and the resulting difference signal is applied to the blade power amplifier and motor 140 to develop the drive current signal and restore the proper blade position. In state 2 position disturbances are thus continuously corrected in real time.

Referring back to FIG. 5, in state 2, the measured light intensity signal is simultaneously compared to the commanded light intensity signal to produce the intensity error signal due to lamp output fluctuations. The intensity error signal is employed to control the lamp current as described above.

In summary of its operation, the servo control system described above: changes illumination levels at scanning rates in a film scanner; controls aperture position to illumination level during a change; shapes the control gain to cancel the non-linear beam characteristics; captures the aperture position when proper illumination level is reached; controls aperture position to captured position between changes; operates in conjunction with lamp current modulation control; maintains a steady aperture position during film scanning completely impervious to intensity fluctuation caused by the lamp and lamp current control; rejects position disturbances while drawing minimal power while at rest to minimize temperature buildup and reserve its continuous power delivery capability for level changes; resists random disturbances impacting aperture position while at a desired illumination level up to the maximum torque capability of the system; uses servo rate feedback for stability and uses the same rate signal for both changing intensity and holding position; and derives rate (velocity) information from the sum of the derivative of position passed through a low pass filter and the load model estimate from motor current passed through a high pass filter.

The preferred aperture setting apparatus that is mechanically capable of being operated at the speed and with the accuracy and reliability required to change from one aperture position to any other aperture position within one film frame scanning period is described in the above referenced U.S. Pat. No. 5,414,460 application from which FIGS. 9–11 are copied. In the preferred embodiment, the blades 35 and 37 are realized in respectively numbered sections of a thin (0.002 inch), continuous, steel band 233 shown separately in FIG. 11. The steel band 233 has solid, flat, center sections and cut-out, loop, end sections as shown. The solid, flat sections 235 and 237 of steel band 233 are bounded by shaped sides 235' and 237' that have the same shape as the openings 35' and 37' described above that allow the light beam to pass through the aperture 39 defined when steel band sections 235 and 237 are aligned closely together and in parallel so that the shaped sides 235' and 237' are properly aligned as shown. The solid sections 235 and 237 are also bounded by flat sides 235" and 237" at the boundaries with the loop end sections. The elongated cut-out openings 239 and 241 split the band lengthwise into parallel, narrow loop sections $239_1$, $239_2$ and $241_1$, $241_2$ that ride on bearings and a motor driven spool as shown in FIGS. 9 and 10.

As illustrated earlier in FIG. 2, the shaped sides 235' and 237' of the cut-out openings 239 and 241 provide the aperture opening 39 for the illumination beam to pass through. The near Gaussian nature of the illumination beam distribution creates a nonlinear relationship between change in beam power versus aperture position change. As described above, the aperture opening is shaped to improve or lower the ratio of maximum to minimum gain, where gain is the change in intensity error with respect to position as described above. Also, the aperture shape improves resolution by lowering the sensitivity to aperture position errors in the low transmission region at or near the fully closed aperture position.

Returning to FIGS. 9 and 10, the apparatus 33 includes a box-shaped die cast housing 240 and a front metal cover 270, each having aligned aperture openings 242 and 272, respectively, within which the steel band 233 is mounted for movement by an internally contained drive motor and idler mechanism. In the housing 240, the cut-out band loop sections $241_1$, $241_2$, and $239_1$, $239_2$, are attached to the drive spools $244_1$, $244_2$, (attached to the drive shaft 244), and are wrapped around the tension and return idler assembly 246 including the bearing races $246_1$, $246_2$, respectively. The solid band sections 235 and 237 are generally supported and moved laterally in first and second parallel planes so that the shaped sides 235' and 237' face one another. A drive motor assembly 248 rotates the drive shaft 244 and thereby moves the steel band 233 to draw the shaped sides 235' and 237' toward and away from one another from a center point of the aligned aperture openings 242 and 272 in a prescribed range of motion. A pin stop 245 attached to housing 240 interferes with the drive assembly to prevent rotation of the drive shaft 244 beyond the working range.

The thin steel band 233 is wrapped around the motor drive spools $244_1$, $244_2$, over a further pair of first and second idlers 260 and 262, the tension and return idler 246 mounted bearing races $246_1$, $246_2$, and back to the drive spools $244_1$, $244_2$. The tension and return idler 246 bearing races $246_1$, $246_2$ are supported by respective bearings $250_1$, $250_2$ that rotate on a stationary axle 252 that is mounted by shoulder screws $254_1$, $254_2$ to the housing 240. The shoulder screws $254_1$, $254_2$ allow the slotted ends of the axle 252 to be biased by springs (not shown) away from the drive spools $244_1$, $244_2$ and provide constant band tension across the entire band height.

The first and second idlers 260 and 262 have bearing outer races $260_1$, $260_2$, and $262_1$, $262_2$, respectively, that bear against the edges of solid section 235 on one side of the band 233 and guide the front and rear band sections 235 and 237 into nearly the same plane. The idler bearing assemblies of each such idler 260 and 262 are configured such that only the races bearing on the steel band 233 rotate to achieve a low mass.

Consequently, the steel band 233 and the drive spools $244_1$, $244_2$ and the tension and return idler mounted bearings $246_1$, $246_2$, have sufficiently light inertial mass to allow movement in the specified time when driven by a miniature, high performance, permanent magnet D.C. motor 248' in drive motor assembly 248. To maintain long life, the thickness of the steel band 233 and the bending radius about the idlers and drive spools are carefully specified to ensure that the bend radii are greater than minimum specified for the steel band.

The steel band 233 cut-outs or openings 239 and 241 reduce the mass of the steel band 233 to allow higher acceleration and are further shaped to remove the clock spring effect of the loop portions of the band as it passes over the drive spools and the idlers. This clock spring effect arises if unequal areas of the steel band are bent on the driven end and the idler end as the drive spools are rotated. Such a clock spring effect would provide a constant load force on the motor and the control system affecting dynamic response and accuracy. The drive motor would be forced to expend energy countering the clock spring effect to maintain the commanded aperture opening, raising its temperature and reducing its ability to respond as frequently to commanded light intensity changes, thus lowering the duty cycle.

The motor assembly includes an unframed, limited angle, high torque, drive motor 248' which is mounted to the drive shaft 244 to provide the torque required for rotation to the drive spools $244_1$ and $244_2$. The motor 248' is preferably a single winding, toroidally wound device that supplies a flat torque profile over the angle of excursion necessary to move the steel band 233 and the shaped side 235' and 237' between full open to full closed aperture positions. The radii of the motor drive spools $244_1$, $244_2$ are sized to provide linear motion of the steel band 233 within the motor working range. Since the motor 248' is a single winding device, no commutation is required, avoiding commutation noise and torque disturbance. The motor 248' is driven by a matched linear power amplifier to further minimize the potential for noise emission.

Accuracy in steering or movement of the steel band 233 must be maintained to insure precision and speed in changing and maintaining the aperture opening designated by the control system. Stable, non-slipping position is maintained by two sets of two registration pins (not shown) and an attachment screw $264_1$, $264_2$ on the respective drive spools $244_1$, $244_2$ and registration pins $266_1$, $246_2$ on the respective tension and return idlers $246_1$, $246_2$, respectively. The attachment screws $264_1$, $264_2$ and pins fit in a series $265_1$, $265_2$ of three holes in loop sections $241_1$, $241_2$, respectively, as shown in FIG. 6. Similarly, the pins $266_1$, $266_2$, fit in holes $267_1$, $267_2$ in the loop sections $239_1$, $239_2$, respectively, of the steel band 233 shown in FIG. 6. The band is thereby attached so that it cannot slip off from the drive and idler mechanism.

The tension exerted by the spring loaded, tension and return idler races $246_1$, $246_2$ and the low elasticity of the steel band 233 provides a stiff drive from the motor drive spools $244_1$, $244_2$ to the aperture opening 39 position. This allows the high response servo regulator based control system described above to be implemented.

A rotary variable differential transformer (RVDT) 256 is coupled by a coupling 258 to the drive shaft 244 attached to the motor drive spools $244_1$, $244_2$. The RVDT 256 is a limited angle device providing a linear output over a limited angle of rotation matched to the system angular range and provides a continuous feedback signal of the absolute position of the steel band 233 which is attached to the motor drive spools $244_1$, $244_2$. The RVDT 256 contains no wearing elements other than bearings and provides continuous information allowing near infinite resolution. The RVDT 256 may be a model R30D obtained from Lucas Schaevitz, Corp. Position information could also be provided by an optical encoder with the appropriate change in control electronics.

Other items depicted in FIG. 9 include a thermostat 280 attached to housing 240 to monitor the temperature of the motor housing. An excessive temperature may be detected and the system may be shut down to avoid damage to the motor.

In use, the low mass steel band 233 is driven back and forth by the high torque motor 248' to allow fast changes in position comparable to video and film frame scanning rates.

The actual position of the band 233, that correlates to the size of the aperture defined by the shaped side surfaces 235', 237', is detected by the RVDT 256. By providing near real time illumination control in the telecine that adjusts the illumination level of the light beam within one film frame scanning interval (e.g. 33 milliseconds), the video system can repeat the previous or succeeding scanned video frame in place of the transition frame. Illumination levels can thus be changed without the need to stop the film transport system and without creating a video image with a transitioning light level.

The aperture setting mechanism used in the control system described above uses thin blades driven to interrupt the light beam from the outside, locates the interrupting blades nearly in the same plane, operates in conjunction with the integrating cylinder to provide a nearly constant, uniform output, light profile at the cylinder aperture through the range of aperture blade positions, locates the aperture blades in the optical path along the beam midway between an aperture stop and a field stop plane prior to the integrating cylinder, preserves the low noise center light portion of the beam, and uses blade opening shape to reduce the ratio of maximum to minimum non-linear system gain and lowers the sensitivity to aperture position errors in the low transmission region which allows finer resolution.

Although the illumination control system of the present invention was designed to work within the aperture setting apparatus of FIGS. 9–11, it could be used in other aperture setting apparatus with or without any modifications. And, the aperture shape effected by the shaped sidewalls 135' and 137' could be altered for this and for other applications.

A first alternative embodiment of the aperture setting apparatus also considered for use with the illumination control system includes pivot mounted blades each mounted on a single pivot and driven by a rotary voice coil motor. Bearings are required at the rotating pivots only. The edge shapes in the blades are equivalent to the shaped edges of the solid sections of the steel band described above with the same features and advantages. A position sensor coupled to the pivot provides feedback information for blade position. This approach requires two motors and two position sensors in addition to the added control complexity of keeping the blades beam centered in the light beam. However, additional advantages of the dual blade approach include a simpler and lighter mechanical structure, fewer bearings than those necessary to move and guide the continuous steel band, and low mass for higher performance and rapid response.

A further alternate embodiment that we have conceived involves substituting an edge drive to the aperture wheel of the '596 patent. The addition of permanent magnet sections to the wheel outer circumference allows the creation of a brushless disc, linear motor which is a motor design well established in the current art. Commutation electronics alternately drives current to motor windings to create torque. Torque is created at the outer circumference to generate the acceleration required for the aperture wheel. With the motor embodied on the disk circumference, a stiff drive with a simple mechanical bearing system would be created. This approach would be applicable for interrupting smaller beams due to the rapidly expanding inertial mass of the wheel at the larger diameters required for large diameter beams.

The illumination control system of the present invention may advantageously be employed with different apparatus for providing the elongated strip of diffuse illumination. Specifically, the light integrator 80 may take other forms e.g. integrating spheres or other shapes having an input port for the introduction of the light beam.

The invention having been described in detail with particular reference to the preferred embodiments thereof, it will be understood that variations and modifications can be effected within the spirit and scope of the invention.

What is claimed is:

1. In an illumination system for a film telecine scanner, of the type adapted to illuminate the image frames of a film and to derive video image frame data from the illuminated image frames within a video frame scanning time interval, comprising an illumination light source which is adapted to provide a light beam along an optical path in said system, means located in said optical path for receiving said light beam from said light source and for illuminating the image frames of the film with diffuse, uniform illumination, and means for measuring the intensity of light delivered to said image frame illuminating means and providing a measured light intensity signal, an improved illumination control apparatus comprising:

light control means providing a range of aperture defining positions and adjustable in aperture defining position in said optical path having a mass sufficiently low to allow adjustment of the aperture position from any one aperture position to any other aperture position within a video frame scanning time interval for modulating the amount of light that is delivered from said light source to said film illuminating means;

means for providing commanded light intensity signals during the scanning of the film related to the film type and the illumination levels of scenes captured in the image frames of the film being scanned;

regulator means operable in a first state for selectively adjusting the aperture defining position of said light control means within said video frame scanning time interval in response to the commanded light intensity signal and the measured light intensity signal, and operable in a second state for maintaining the position of said light control means; and means for switching said regulator means from the first state to the second state when the adjusted in position of said light control means is completed and from the second state to the first state in response to a commanded light intensity signal.

2. The illumination control apparatus of claim 1 wherein said light control means further comprises:

aperture defining means operable in response to a drive signal and selectively locatable in a plurality of aperture positions with respect to said optical path for selectively decreasing or increasing the diameter of said light beam to interrupt more or less of said light beam and thereby selectively adjust the amount of light entering said image frame illuminating means; and position detecting means for providing an aperture position signal representing the instantaneous aperture position of said aperture defining means.

3. The illumination control apparatus of claim 2 wherein said regulator means further comprises:

intensity regulator means operable in the first state in response to the commanded light intensity signal and the measured light intensity signal for providing a drive signal for operating said aperture defining means until the aperture position set thereby adjusts the measured light intensity until it equals the commanded light intensity: and position regulator means operable in said second state in response to the aperture position set in the first state, and the instantaneous aperture position signal for providing a drive signal for operating said aperture defining means and maintaining said aperture position set in the first state.

4. The illumination control apparatus of claim 2 wherein said regulator means further comprises:

intensity regulator means operable in said first state for deriving the drive signal in response to an intensity error signal representing the difference between the commanded light intensity signal and the measured light intensity signal and for applying the drive signal to said aperture defining means until the intensity error signal is decreased to a certain value.

5. The illumination control apparatus of claim 4 wherein said intensity regulator means further comprises:

intensity gain shaping means operable in the first state and responsive to the position signal for applying a gain value to the intensity error signal to compensate for non-linear light intensity variations with respect to the aperture positions and for deriving the drive signal from the gain shaped intensity error signal.

6. The illumination control apparatus of claim 4 wherein said regulator means further comprises:

means operable in said first state for storing the value of the aperture position signal when the intensity error signal is at the certain value.

7. The illumination control apparatus of claim 4 wherein said switching means further comprises:

means operable in the second state for setting the gain value provided by said intensity gain shaping means to zero.

8. The illumination control apparatus of claim 4 wherein said regulator means further comprises:

means operable in said first state for storing the value of the aperture position signal when the intensity error signal is at the certain value; and position regulator means operable in said second state for comparing the current aperture position signal to the stored aperture position signal, for providing a position error signal representing the difference therebetween and for deriving a drive signal therefrom and applying the drive signal to said aperture defining means to minimize the position error signal.

9. The illumination control apparatus of claim 8 wherein said position regulator means further comprises:

position gain shaping means operable in the second state for applying a gain value to the position error signal for deriving the drive signal from the gain shaped position error signal.

10. The illumination control apparatus of claim 9 wherein said switching means further comprises:

means operable in the first state for setting the gain value provided by said position gain shaping means to zero.

11. The illumination control apparatus of claim 8 wherein said regulator means further comprises:

intensity regulator means operable in said first state for deriving the drive signal in response to an intensity error signal representing the difference between the commanded light intensity signal and the measured light intensity signal and for applying the drive signal to said aperture defining means until the intensity error signal is decreased to a certain value.

12. The illumination control apparatus of claim 11 wherein said intensity regulator means further comprises:

intensity gain shaping means operable in the first state and responsive to the position signal for applying a gain value to the intensity error signal to compensate for non-linear light intensity variations with respect to the aperture positions and for deriving the drive signal from the gain shaped intensity error signal; and wherein said position regulator means further comprises:

position gain shaping means operable in the second state for applying a gain value to the position error signal for deriving the drive signal from the gain shaped position error signal.

13. The illumination control apparatus of claim 12 wherein said switching means further comprises:

means operable in the second state for setting the gain value provided by said intensity gain shaping means to zero; and means operable in the first state for setting the gain value provided by said position gain shaping means to zero.

14. The illumination control apparatus of claim 1 wherein said light control means further comprises:

aperture defining means operable in response to a drive signal and selectively locatable in a plurality of aperture positions with respect to said optical path for selectively decreasing or increasing the diameter of said light beam to interrupt more or less of said light beam and thereby selectively adjust the amount of light entering said image frame illuminating means; and position detecting means for providing a position signal representing the instantaneous aperture position of said aperture defining means; and wherein said regulator means further comprises:

velocity detecting means for providing an aperture speed signal during movement of said aperture defining means between aperture positions.

15. The illumination control apparatus of claim 14 wherein said regulator means further comprises:

intensity regulator means operable in said first state in response to the commanded light intensity signal and the measured light intensity signal and the aperture speed signal for providing a drive signal for operating said aperture defining means until the aperture position set thereby adjusts the measured light intensity until it equals the commanded light intensity: and position regulator means operable in said second state in response to the aperture position set in the first state, the aperture position signal and the aperture speed signal for providing a drive signal for operating said aperture defining means and maintaining said aperture position set in the first state.

16. The illumination control apparatus of claim 14 wherein said regulator means further comprises:

intensity regulator means operable in said first state for deriving a drive signal in response to an intensity error signal representing the difference between the commanded light intensity signal and the measured light intensity signal and in response to the aperture speed signal for applying the drive signal to said aperture defining means until the intensity error signal is decreased to a certain value, whereby the drive signal and the aperture speed signals are decreased to zero.

17. The illumination control apparatus of claim 16 wherein said regulator means further comprises:

means operable in the first state for storing the value of the aperture position signal when the intensity error signal is at the certain value.

18. The illumination control apparatus of claim 16 wherein said intensity regulator means further comprises:

intensity gain shaping means operable in the first state and responsive to the position signal for applying a gain value to the intensity error signal to compensate for non-linear light intensity variations with respect to the aperture positions and for deriving the drive signal from the gain shaped intensity error signal and the aperture speed signal.

19. The illumination control apparatus of claim 17 wherein said switching means further comprises:

means for switching from the first state to the second state when the aperture speed signal and the intensity error signal are reduced to certain values; and means operable in the second state for setting the gain value provided by said intensity gain shaping means to zero.

20. The illumination control apparatus of claim 16 wherein said regulator means further comprises:

means operable in said first state for storing the value of the aperture position signal when the intensity error signal is at the certain value; and position regulator means operable in said second state for comparing the current aperture position signal to the stored aperture position signal, for providing a position error signal representing the difference therebetween and for deriving a drive signal from the position error signal and the aperture speed signal and for applying the drive signal to said aperture defining means to minimize the position error signal.

21. The illumination control apparatus of claim 20 wherein said position regulator means further comprises:

position gain shaping means operable in the second state for applying a gain value to the position error signal for deriving the drive signal from the gain shaped position error signal.

22. The illumination control apparatus of claim 21 wherein said switching means further comprises:

means operable in the first state for setting the gain value provided by said position gain shaping means to zero.

23. The illumination control apparatus of claim 20 wherein said regulator means further comprises:

intensity regulator means operable in said first state for deriving the drive signal in response to an intensity error signal, representing the difference between the commanded light intensity signal and the measured light intensity signal, and the aperture speed signal, and for applying the drive signal to said aperture defining means until the intensity error signal is decreased to a certain value.

24. The illumination control apparatus of claim 23 wherein said intensity regulator means further comprises:

intensity gain shaping means operable in the first state and responsive to the position signal for applying a gain value to the intensity error signal to compensate for non-linear light intensity variations with respect to the aperture positions and for deriving the drive signal from the gain shaped intensity error signal and the aperture speed signal; and wherein said position regulator means further comprises:

position gain shaping means operable in the second state for applying a gain value to the position error signal for deriving the drive signal from the gain shaped position error signal and the aperture speed signal.

25. The illumination control apparatus of claim 24 wherein said switching means further comprises:

means operable in the second state for setting the gain value provided by said intensity gain shaping means to zero; and means operable in the first state for setting the gain value provided by said position gain shaping means to zero.

26. The illumination control apparatus of claim 1 wherein said light control means further comprises:

aperture defining means including a drive motor operable in response to a drive signal and an aperture setting mechanism selectively moveable by the drive motor and locatable in a plurality of aperture positions with respect to said optical path for selectively decreasing or increasing the diameter of said light beam to interrupt more or less of said light beam and thereby selectively adjust the amount of light entering said image frame illuminating means in response to the drive signal applied to the drive motor, the drive motor and aperture setting mechanism having load and performance factors that may be characterized as a load model; and position detecting means for providing a position signal representing the instantaneous aperture position of said aperture setting mechanism; and wherein said regulator means further comprises:

velocity detecting means for processing the drive signal and the position signal for providing an estimated aperture speed signal as a function of the high frequency portion of said load model estimated velocity with the low frequency portion of the derivative of the position signal during movement of said aperture setting mechanism between aperture positions.

27. The illumination control apparatus of claim 26 wherein said aperture setting mechanism further comprises:

first and second movable blades placed at a location along said optical path and movable between a full open aperture position outside said optical path and through a plurality of stopped down aperture defining positions interrupting said optical path, wherein said first and second movable blades move relative to and overlap one another when in said plurality of stopped down aperture defining positions, and said first and second movable blades have respective first and second leading edges shaped to define a respective plurality of stopped down apertures generally defining the diameter of said light beam passing therethrough and entering said image frame illuminating means, whereby spatial intensity variations in said light emitted from said light source are minimized at the plurality of stopped down apertures.

28. The illumination control apparatus of claim 27 wherein said light beam is generally circular and exhibits a non-linear relationship between light beam intensity level and distance from the center of the light beam and wherein said first and second leading edges are shaped to at least partially compensate for said non-linear relationship at said plurality of aperture defining positions and reduce the ratio of maximum to minimum non-linear system gain and lower the sensitivity to aperture position errors in the low transmission region.

29. In an illumination system for a film telecine scanner, of the type adapted to provide a line of illumination on the image frames of a film which is supported for movement in a film gate of the scanner and comprising an adjustable output light source driven by a lamp current signal which is adapted to provide a generally circular light beam along an optical path in said system, light integrating means located in said optical path for receiving the light from said light source and for producing a line or diffuse illumination on the film, means for measuring the intensity of light delivered to said light integrating means and providing a measured light intensity signal, and means responsive to the measured light intensity signal for adjusting the light output of said light source, an improved illumination control apparatus comprising:

light control means located in said optical path for providing a range of aperture defining positions and having a mass sufficiently low to allow adjustment of the aperture position from any one aperture position to any other aperture position within a video frame scanning time interval for adjusting the amount of light that is delivered from said light source to said integrating means and for providing an adjustment position signal;

means for providing commanded light intensity signals related to the film type and the illumination levels of scenes captured in the image frames of the film being scanned;

regulator means operable in a first state for selectively adjusting said light control means within the video time scanning interval for scanning a signal image frame of the film in response to each commanded light intensity signal and the measured light intensity signal, and operable in a second state for maintaining the adjustment of said light control means in response to the adjustment position set in the first state; and means for switching said regulator means from the first state to the second state when the adjustment of said light control means is completed and from the second state to the first state in response to a commanded light intensity signal.

30. The illumination control apparatus of claim 29 further comprising:

means responsive to said switching means and operable in the first state for providing a fixed lamp current signal to said adjustable intensity light source and operable in the second state for providing an adjustable lamp current dependent on the intensity error signal for compensating for light source intensity fluctuations in the second state.

31. The illumination control apparatus of claim 30 wherein said light control means further comprises:

aperture defining means including a drive motor operable in response to a drive signal and an aperture setting mechanism selectively moveable by the drive motor and locatable in a plurality of aperture positions with respect to said optical path for selectively decreasing or increasing the diameter of said light beam to interrupt more or less of said light beam and thereby selectively adjust the amount of light entering said image frame illuminating means in response to the drive signal applied to the drive motor, the drive motor and aperture setting mechanism having load and performance factors that may be characterized as a load model; and position detecting means for providing a position signal representing the instantaneous aperture position of said aperture defining means; and wherein said regulator means further comprises:

velocity detecting means for processing the drive signal and the position signal for providing an estimated aperture speed signal as a function of the high frequency portion of said load model estimated velocity with the low frequency portion of the derivative of the position signal during movement of said aperture defining means between aperture positions.

32. The illumination control apparatus of claim 31 wherein said regulator means further comprises:

intensity regulator means operable in the first state in response to the commanded and measured light intensity signal and the aperture speed signal for deriving a drive signal for operating said drive motor until the aperture position set thereby adjusts the measured light intensity until it equals the commanded light intensity;

means responsive to the switching means for storing the aperture adjustment position signal upon switching from the first state to the second state; and position regulator means operable in said second state for comparing the instantaneous aperture adjustment position signal to the stored aperture adjustment position signal and for providing a position error signal therefrom, and for providing a drive signal from the position error signal and the aperture speed signal for reducing position errors due to disturbances of the aperture defining means while operating in the second state.

33. The illumination control apparatus of claim 32 wherein said intensity regulator means further comprises:

intensity gain shaping means operable in the first state and responsive to the position signal for applying a gain value to the intensity error signal to compensate for non-linear light intensity variations with respect to the aperture positions and for deriving the drive signal from the gain shaped intensity error signal and the aperture speed signal; and wherein said position regulator means further comprises:

position gain shaping means operable in the second state for applying a gain value to the position error signal for deriving the drive signal from the gain shaped position error signal and the aperture speed signal.

34. The illumination control apparatus of claim 33 wherein said switching means further comprises:

means operable in the second state for setting the gain value provided by said intensity gain shaping means to zero; and means operable in the first state for setting the gain value provided by said position gain shaping means to zero.

35. The illumination control apparatus of claim 34 wherein said switching means further comprises:

means for switching from the first state to the second state when the aperture speed signal and the intensity error signal are reduced to certain values.

36. In an illumination system for a film telecine scanner, of the type adapted to provide a line of illumination on the image frames of a film which is supported for movement in a film gate of the scanner and comprising an adjustable output light source driven by a lamp current signal which is adapted to provide a generally circular light beam along an optical path in said system, light integrating means located in said optical path for receiving the light from said light source and for producing a line of diffuse illumination on the film, means for measuring the intensity of light delivered to said light integrating means and providing a measured light intensity signal, and means responsive to the measured light intensity signal for adjusting the light output of said light source, a method of operating an improved illumination control system in a first state for changing the intensity of the light beam and in a second state for maintaining the intensity of the light beam comprising the steps of:

positioning an aperture defining mechanism in said light beam having a range of aperture positions for interrupting the light beam and thereby adjusting the intensity of the light beam and having a mass sufficiently low to allow adjustment of the aperture position from any one aperture position to any other aperture position within a video frame scanning time interval, wherein the aperture defining mechanism exhibits an intensity gain in relation to aperture position that is non-linear through at least a portion of the range of aperture positions; and in the first state:

providing commanded light intensity signals during the scanning of a film related to the film type and the illumination levels of scenes captured in the image frames of the film being scanned;

comparing the commanded light intensity signal to the detected light intensity signal and developing an intensity error signal;

detecting the instantaneous aperture position of the aperture defining mechanism and providing a position signal;

applying a gain correction factor to the intensity error signal as a function of the position signal;

adjusting the aperture defining mechanism to a new aperture position for decreasing the intensity error signal to a predetermined value in response to the gain corrected intensity error signal;

detecting the rate of change of the aperture defining mechanism and providing an aperture speed signal;

modulating the gain corrected intensity error signal by the aperture speed signal to thereby adjust the amount of light that is delivered from said light source to said integrating means within the time span of scanning a single image frame of the film; and storing the position of the adjusted aperture defining mechanism and switching to the second state after the intensity error and the aperture speed signals are reduced to certain values in the second state:

comparing the instantaneous position signal to the stored adjusted aperture position and developing a position error signal when aperture position is disturbed;

adjusting the aperture defining mechanism to restore the aperture position thereby decreasing the position error signal to a predetermined value in response to the position error signal;

detecting the rate of change of the aperture defining mechanism and providing an aperture speed signal;

modulating the position error signal by the aperture speed signal to thereby maintain the commanded light intensity delivered from said light source to said integrating means in the presence of disturbances affecting the aperture position.

37. An illumination system for a film telecine scanner, of the type adapted to illuminate the image frames of a film and to derive video image frame data from the illuminated image frames within a video frame scanning time interval, comprising:

an illumination light source which is adapted to provide a light beam along an optical path in said system;

means located in said optical path for receiving said light beam from said light source and for illuminating the image frames of the film with a line of diffuse, uniform illumination;

means for measuring the intensity of light delivered to said image frame illuminating means and providing a measured light intensity signal;

a light control modulator adjustable in position in said optical path between said light image frame illuminating means and said light source for modulating the amount of light that is delivered from said light source to said image frame illuminating means, said light control modulator further comprising aperture means located in said optical path for optical path for providing a range of aperture defining positions and adjustable in aperture defining position in said optical path from any one aperture defining position to any other aperture defining position within a video frame scanning time interval for adjusting the amount of light that is delivered from said light source to said image frame illuminating means;

means for providing commanded light intensity signals during scanning of the film related to the type of film being scanned and the illumination levels of particular scenes captured in the image frames of the film being scanned; and regulator means for selectively adjusting the position of said light control means within said video frame scanning time interval during scanning of the film in response to each commanded light intensity signal and the measured light intensity signal.

38. The illumination system of claim 37 wherein said aperture means further comprises:

aperture defining blades operable by an aperture drive motor in response to a drive signal and selectively locatable in said plurality of aperture defining positions with respect to said optical path for selectively decreasing or increasing the diameter of said light beam to interrupt more or less of said light beam and thereby selectively adjust the amount of light entering said image frame illuminating means.

39. The illumination system of claim 38 wherein said regulator means further comprises:

intensity regulator means operable in response to the commanded light intensity signal and the measured light intensity signal for providing said drive signal for operating said aperture defining blade drive motor until the aperture position set thereby adjusts the measured light intensity until it equals the commanded light intensity for adjusting light intensity illumination level of a particular scene captured in the image frames of the film during the video frame scanning time interval:

position detecting means for providing a position signal representing the instantaneous aperture position of said aperture defining blades upon setting the aperture position and during illumination of the image frames at the set aperture position; and position regulator means operable in response to a comparison of the position signal derived on setting the aperture position by said intensity regulator means and the instantaneous aperture position signal for providing a drive signal for operating said aperture defining blade drive motor and maintaining said aperture position set in response to the commanded light intensity signal.

40. The illumination system of claim 39 wherein said intensity regulator means further comprises:

intensity gain shaping means responsive to the position signal for applying a gain value to the intensity error signal to compensate for non-linear light intensity variations with respect to the aperture positions and for deriving the drive signal from the gain shaped intensity error signal.

41. The illumination system of claim 37 wherein said aperture means further comprises:

a drive motor operable in response to a drive signal and an aperture setting mechanism selectively moveable by the drive motor and locatable in said plurality of aperture defining positions with respect to said optical path for selectively decreasing or increasing the diameter of said light beam to interrupt more or less of said light beam and thereby selectively adjust the amount of light entering said image frame illuminating means in response to the drive signal applied to the drive motor, the drive motor and aperture setting mechanism having load and performance factors that may be characterized as a load model; and wherein said regulator means further comprises;

position detecting means for providing a position signal representing the instantaneous aperture position of said aperture setting mechanism upon setting the aperture defining position and during illumination of the image frames at the set aperture position; and wherein said regulator means further comprises:

velocity detecting means for processing the drive signal and the position signal for providing an estimated aperture speed signal as a function of the high frequency portion of said load model estimated velocity with the low frequency portion of the derivative of the position signal during movement of said aperture setting mechanism between aperture defining positions.

42. The illumination system of claim 41 wherein said aperture setting mechanism further comprises:

first and second movable blades placed at a location along said optical path and movable between a full open aperture position outside said optical path and through a plurality of stopped down aperture defining positions interrupting said optical path, wherein said first and second movable blades move relative to and overlap one another when in said plurality of stopped down aperture defining positions, and said first and second movable blades have respective first and second leading edges shaped to define a respective plurality of stopped down apertures generally defining the diameter of said light beam passing therethrough and entering said image frame illuminating means, whereby spatial intensity variations in said light emitted from said light source are minimized at the plurality of stopped down apertures.

43. The illumination system of claim 42 wherein said light beam is generally circular and exhibits a non-linear relationship between light beam intensity level and distance from the center of the light beam and wherein said first and second leading edges are shaped to at least partially compensate for said non-linear relationship at said plurality of aperture defining positions and reduce the ratio of maximum to minimum non-linear system gain and lower the sensitivity to aperture position errors in the low transmission region.

44. The illumination system of claim 37 wherein said regulator means further comprises:

intensity regulator means for deriving an intensity error signal representing the difference between the commanded light intensity signal and the measured light intensity signal and for employing said intensity error signal to adjust the position of said light control modulator until the intensity error signal is decreased to a certain value;

position detecting means for providing a position signal representing the instantaneous position of said light control modulator upon setting the position of said light control modulator and during illumination of the image frames at the set position; and position regulator means operable in response to a comparison of the position signal derived on setting the aperture position by said intensity regulator means and the instantaneous aperture position signal derived during illumination of image frames for maintaining said light modulating position set in response to the commanded light intensity signal.

45. A method of operating a film telecine scanner of the type adapted to illuminate the image frames of a film and to derive video image frame data from the illuminated image frames within a video frame scanning time interval comprising the steps of:

providing a light beam along an optical path in said scanner;

receiving said light beam from said light source and illuminating the image frames of the film with a line of diffuse, uniform illumination;

measuring the intensity of the received light beam and providing a measured light intensity signal;

providing commanded light intensity signals during scanning of the film related to the type of film being scanned and the illumination levels of particular scenes captured in the image frames of the film being scanned;

comparing the measured light intensity signal to each commanded light intensity signal and deriving an intensity error signal representing the difference between the commanded light intensity signal and the measured light intensity signal; and mechanically modulating the amount of light provided in said optical path from said light source in response to said intensity error signal to drive said intensity error signal to zero within the video frame scanning time interval for scanning an image frame of the film being scanned.

46. The method of claim 45 wherein said modulating step further comprises:

positioning an aperture defining mechanism in said optical path having a range of aperture positions for interrupting the light beam and thereby adjusting the intensity of the light beam passing therethrough and having a mass sufficiently low to allow adjustment of the aperture position from any one aperture position to any other aperture position within a video frame scanning time interval; and adjusting the aperture defining mechanism to a new aperture position for decreasing the intensity error signal to a predetermined value in response to the intensity error signal.

47. The method of claim 46 further comprising the steps of:

detecting the instantaneous aperture position of the aperture defining mechanism and providing a position signal;

storing the adjusted new aperture position signal;

comparing the instantaneous position signal to the stored adjusted new aperture position signal and developing a position error signal when aperture position is disturbed; and adjusting the aperture defining mechanism in response to the position error signal to restored the adjusted aperture position, thereby decreasing the position error signal to a predetermined value.

* * * * *